US010796108B2

United States Patent
Frenz et al.

(10) Patent No.: US 10,796,108 B2
(45) Date of Patent: Oct. 6, 2020

(54) INTEGRATED MACHINE INFORMATION MANAGEMENT WITH APPLICATION INTERACTIVE USER INTERFACE

(71) Applicant: MTS Systems Corporation, Eden Prairie, MN (US)

(72) Inventors: Andrew Frenz, Minneapolis, MN (US); Nicholas M. Kreidberg, Bloomington, MN (US); Andrew Stephen Welters, Minneapolis, MN (US); Paul Christopher Norton, St. Louis Park, MN (US); Jeffrey Michael Crane, Minnetonka, MN (US)

(73) Assignee: MTS SYSTEMS CORPORATION, Eden Prairie, MN (US)

( * ) Notice: Subject to any disclaimer, the term of this patent is extended or adjusted under 35 U.S.C. 154(b) by 0 days.

(21) Appl. No.: 16/213,603

(22) Filed: Dec. 7, 2018

(65) Prior Publication Data
US 2019/0180059 A1    Jun. 13, 2019

Related U.S. Application Data

(60) Provisional application No. 62/596,109, filed on Dec. 7, 2017.

(51) Int. Cl.
*G06Q 30/00* (2012.01)
*G06K 7/00* (2006.01)
(Continued)

(52) U.S. Cl.
CPC ............. *G06K 7/0008* (2013.01); *G06F 9/50* (2013.01); *G06F 16/27* (2019.01); *G06Q 10/08* (2013.01)

(58) Field of Classification Search
CPC ....... G06Q 10/087; G06Q 10/08; G06Q 10/06
(Continued)

(56) References Cited

U.S. PATENT DOCUMENTS 5,636,008 A    6/1997  LoBiondo et al.
6,163,805 A    12/2000 Silva et al.
(Continued)

FOREIGN PATENT DOCUMENTS

CN    101388805 A    3/2009
EP    0410932 A2    1/1991
(Continued)

OTHER PUBLICATIONS

Readme File TestWatch Application Release 1.3 g, Copyright 1994-2004. MTS Systems Corporation.
(Continued)

*Primary Examiner* — Ahshik Kim
(74) *Attorney, Agent, or Firm* — Steven M. Koehler; Westman, Champlin & Koehler, P.A.

(57) ABSTRACT

A computer implemented method of lab management, including providing machine information on a service tag for a machine, the machine information suitable for uniquely identifying the machine, and storing auxiliary information about the machine on at least one of one or more remote devices, the at least one of the one or more remote devices configured to scan the service tag to retrieve machine information therefrom, and to integrate the auxiliary information with the machine information on the service tag.

19 Claims, 32 Drawing Sheets

(51) Int. Cl.
*G06F 16/27* (2019.01)
*G06F 9/50* (2006.01)
*G06Q 10/08* (2012.01)

(58) Field of Classification Search
USPC .......................................................... 235/385
See application file for complete search history.

(56) References Cited

U.S. PATENT DOCUMENTS

| | | |
|---|---|---|
| 6,351,223 B1 | 2/2002 | DeWeerd et al. |
| 6,857,013 B2 | 2/2005 | Ramberg |
| RE38,985 E | 2/2006 | Boatman et al. |
| 7,904,527 B2 | 3/2011 | Sarma |
| 8,069,369 B2 | 11/2011 | Ramberg |
| 8,229,762 B2 | 7/2012 | Romans |
| 8,788,885 B1 | 7/2014 | Cook et al. |
| 8,839,035 B1 | 9/2014 | Dimitrovich et al. |
| 9,015,612 B2 | 4/2015 | Nguyen et al. |
| 9,501,375 B2 | 11/2016 | Frenz |
| 9,652,347 B2 | 5/2017 | Frenz |
| 2003/0014505 A1 | 1/2003 | Ramberg et al. |
| 2004/0073654 A1 | 4/2004 | Sarma |
| 2005/0034029 A1 | 2/2005 | Ramberg et al. |
| 2006/0132161 A1 | 6/2006 | Khandros et al. |
| 2008/0044056 A1 | 2/2008 | Alasia et al. |
| 2008/0077260 A1 | 3/2008 | Porter et al. |
| 2009/0259321 A1 | 10/2009 | Stellari et al. |
| 2009/0295918 A1 | 12/2009 | Horovitz et al. |
| 2010/0077260 A1 | 3/2010 | Pillai et al. |
| 2010/0083048 A1 | 4/2010 | Calinoiu et al. |
| 2010/0131927 A1 | 5/2010 | Pinjala et al. |
| 2010/0275061 A1 | 10/2010 | Lee |
| 2011/0035063 A1 | 2/2011 | Palayur |
| 2011/0138310 A1 | 6/2011 | Gomez et al. |
| 2011/0270626 A1 | 11/2011 | Romans |
| 2012/0029947 A1 | 2/2012 | Wooldridge et al. |
| 2012/0047228 A1 | 2/2012 | Aly |
| 2012/0053778 A1 | 3/2012 | Colvin et al. |
| 2012/0198279 A1 | 8/2012 | Schroeder |
| 2012/0259575 A1 | 10/2012 | Graas et al. |
| 2013/0196600 A1 | 8/2013 | Capers et al. |
| 2013/0212149 A1 | 8/2013 | Frenz |
| 2013/0212512 A1 | 8/2013 | Frenz |
| 2013/0219218 A1 | 8/2013 | Frenz |
| 2015/0095717 A1 | 4/2015 | Frenz et al. |
| 2016/0342151 A1* | 11/2016 | Dey, IV .................... B25F 5/00 |
| 2019/0180588 A1* | 6/2019 | Lerner ................ G06K 7/10366 |
| 2019/0220715 A1* | 7/2019 | Park .................... G06K 17/0022 |

FOREIGN PATENT DOCUMENTS

| | | |
|---|---|---|
| JP | H09120379 A | 5/1997 |
| JP | H10240341 A | 9/1998 |
| JP | 2004070587 A | 3/2004 |
| JP | 2004192297 A | 7/2004 |
| JP | 2009273245 A | 11/2009 |
| JP | 2010182050 A | 8/2010 |
| WO | 0045265 A1 | 8/2000 |
| WO | 2004029808 A2 | 4/2004 |
| WO | 2012024212 A1 | 2/2012 |
| WO | 2016109835 A1 | 7/2016 |

OTHER PUBLICATIONS

Bo, Jiang, "MobileTest: A Tool Supporting Automatic BlackBox Test for Software on Smart Mobile Devices," Second International Workshop on Automation of Software Test (AST '07), Minneapolis, MN, May 2007, pp. 1-7 (Year: 2007).

Brochure featuring MTS Echo frequently asked questions.

Communication for European patent application No. 13710103.6, dated Oct. 18, 2016.

International Search Report and Written Opinion for International patent application No. PCT/US2013/025212, filed Feb. 7, 2013, dated Jul. 15, 2013.

Chinese Office Action, dated Sep. 12, 2018 for Chinese Patent Application No. 201480054010.1, filed Mar. 30, 2016, with English translation.

Japanese Office Action, dated Sep. 18, 2018 for Japanese Patent Application No. 2016-518125, with English translation.

Chinese Office Action for Chinese Patent Application No. 201480054010.1, dated Nov. 17, 2017, with English translation.

International Search Report and Written Opinion for International patent application No. PCT/US2014/058321, filed Sep. 30, 2014, dated Feb. 26, 2015.

International Search Report and Written Opinion for International patent application No. PCT/US2018/064507, filed Dec. 7, 2018, dated Mar. 25, 2019.

* cited by examiner

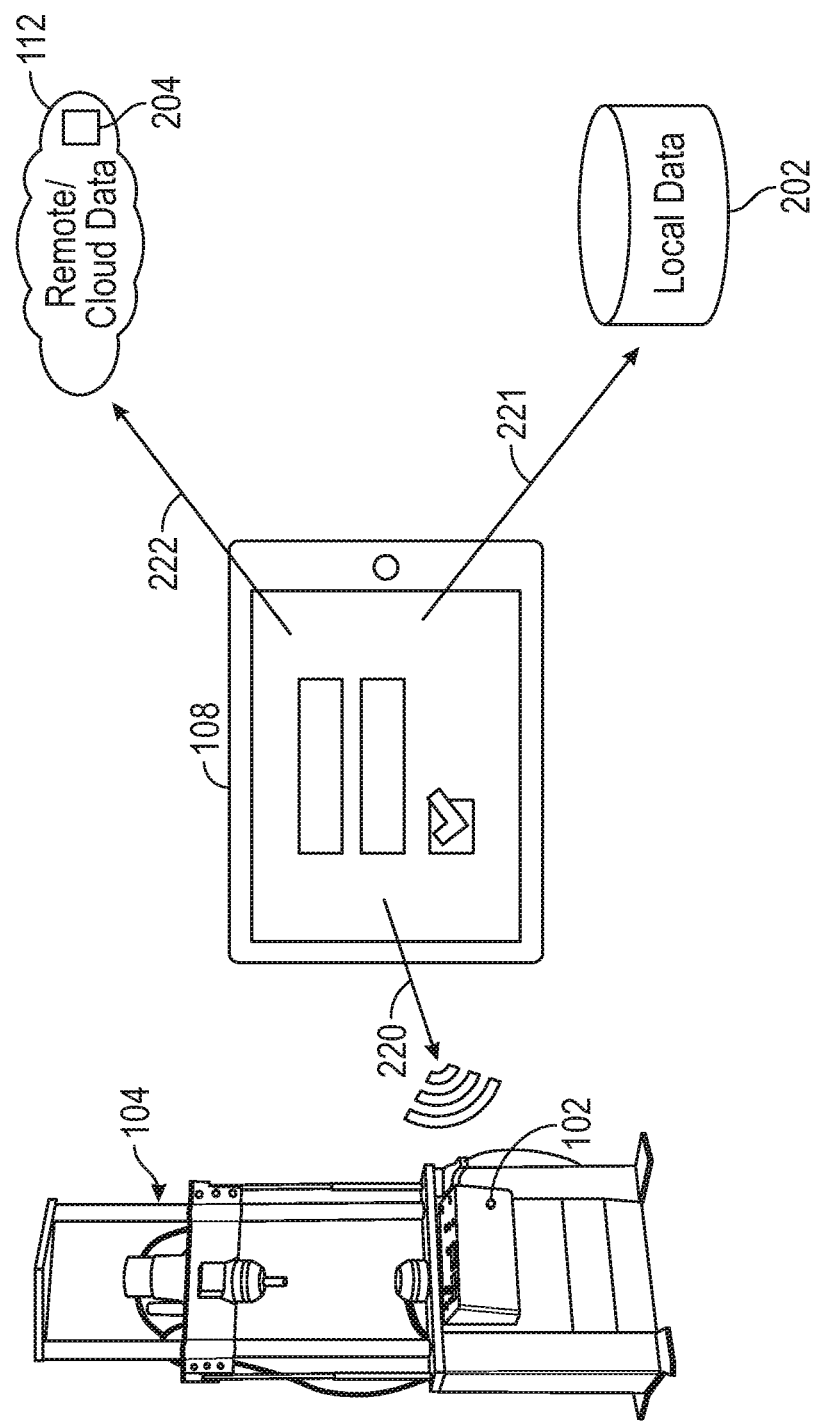

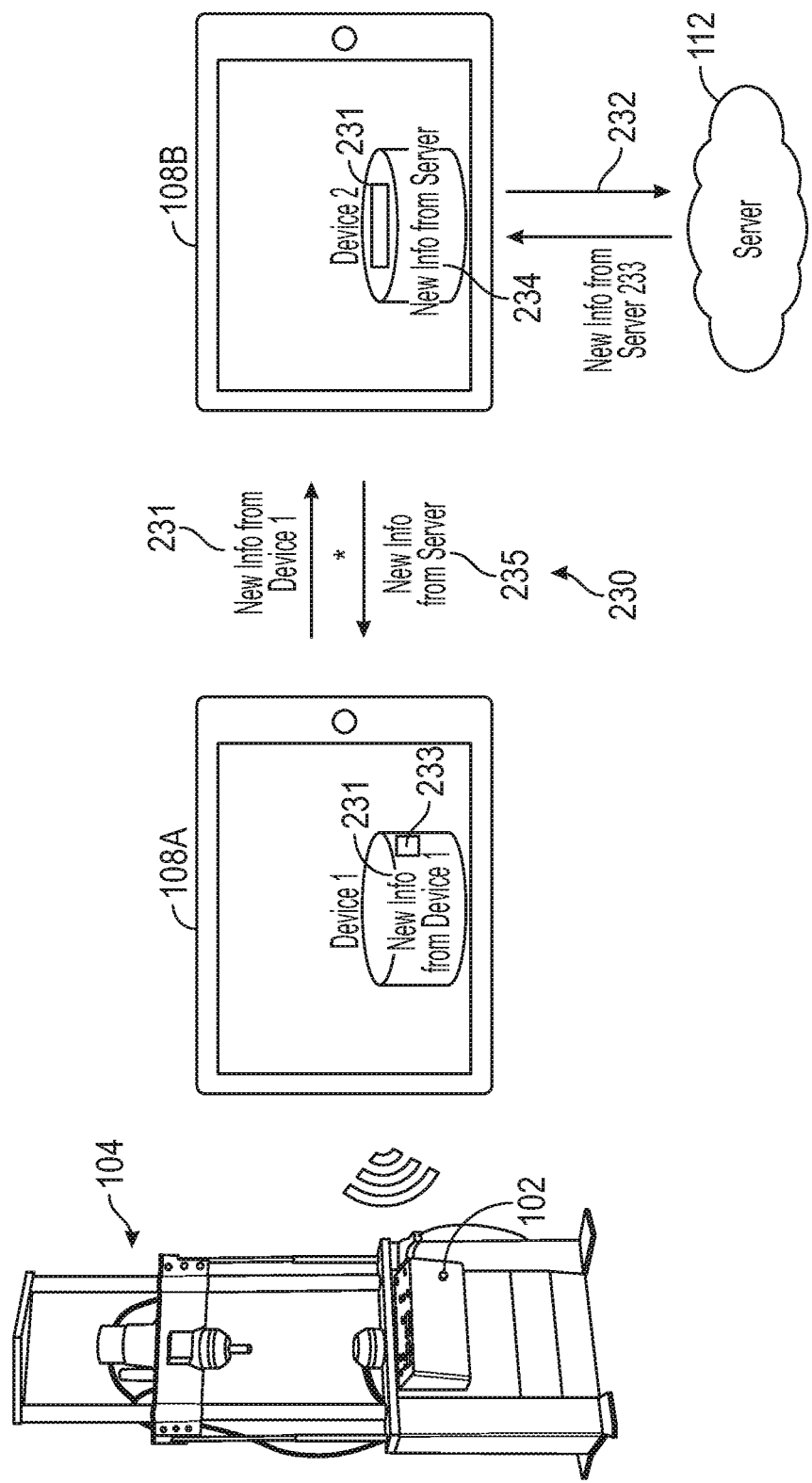

INTEGRATED MACHINE INFORMATION MANAGEMENT WITH APPLICATION INTERACTIVE USER INTERFACE

CROSS-REFERENCE TO RELATED APPLICATION

The present application is based on and claims the benefit of U.S. provisional patent application Ser. No. 62/596,109, filed Dec. 7, 2017, the content of which is hereby incorporated by reference in its entirety.

BACKGROUND

Organizations may operate many machines across many locations and in many laboratories. As the complexity of machines continues to increase, management of maintenance and service for those machines becomes more difficult for users. For example, when a machine breaks down, a call to customer service for that machine often entails the determination of a serial number, model number, and more for that machine. While many machines have labels with such information available on them, machines in a lab environment may not have accessible labels, the labels may be worn or dirty, and the information on those labels may be difficult to read or interpret. Still further, it takes time to find labels, to contact customer service to provide that information, to verify that the information is correct, and to route a customer service call appropriately.

In many customer service situations, a user is presented with a decision tree of automated messages upon contacting customer service. Such decision trees are often overly generic, requiring a user to answer the same or similar questions multiple times, only to find that a single incorrect or not quite correct response results in being returned to a main menu. This can be frustrating as well as time consuming. The longer a machine or machines are out of service, the more production in an organization is affected.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

Without limitation some aspects of the disclosure are provided below.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a computer implemented method of lab management, including providing machine information on a service tag for a machine, the machine information suitable for uniquely identifying the machine; and storing auxiliary information about the machine on at least one of one or more remote devices, the at least one of the one or more remote devices configured to scan the service tag to retrieve machine information therefrom, and to integrate the auxiliary information with the machine information on the service tag. Other embodiments of this aspect include corresponding computer systems, apparatus, and computer programs recorded on one or more computer storage devices, each configured to perform the actions of the methods.

Implementations may include one or more of the following features. The computer implemented method and further including storing additional information about the machine at a remote server accessible by the at least one of the one or more remote devices. The computer implemented method, where the one or more remote devices includes at least a field service engineer device and a customer device. The computer implemented method, and further including creating a new set of machine information including auxiliary and additional information; and synchronizing the new set of machine information to each of the one or more remote devices. The computer implemented method, and further including synchronizing machine information to a remote server accessible by at least one of the one or more remote devices. The computer implemented method, where machine information includes information relating to at least one of service, calibration, health status, and maintenance status of the machine. The computer implemented method, where providing machine information on the service tag includes providing information on one of a near field communication chip, a QR code, a barcode, a Bluetooth device, or a radio frequency identification tag. The computer implemented method, where providing machine information includes providing one or more of model #, serial #, date of manufacture, product label information, and customer machine identifier. A computer readable medium containing machine readable instructions for causing a computer to perform a method with any of the features above. A computing device, including a display; a memory; and a processor operatively coupled to the memory and to the display, the processor configured to perform a method with any of the features above. The computing device where the computing device includes a tablet computer, a mobile phone, a smart device, or a laptop computer. Implementations of the described techniques may include hardware, a method or process, or computer software on a computer-accessible medium.

One general aspect includes a computer implemented method of servicing a machine having a service tag containing identifying information about the machine, the method including reading data from the service tag using a mobile computing device; using the service tag data transferred from or read from the service tag to look up any auxiliary data on the machine that is stored in the mobile computing device; or using the service tag data transferred from or read from the service tag to look up any additional data on the machine that is stored remotely to the mobile computing device; or using the service tag data transferred from or read from the service tag for communicating maintenance current state, actions done, and future actions required on the machine; and using combined information including at least one of service tag data, auxiliary data, and additional data to identify potential service issues for the machine. Other embodiments of this aspect include corresponding computer systems, apparatus, and computer programs recorded on one or more computer storage devices, each configured to perform the actions of the methods.

Implementations may include one or more of the following features. A computer readable medium containing machine readable instructions for causing a computer to perform a method of servicing a machine having a service tag containing identifying information about the machine. A computing device, including a display; a memory; and a processor operatively coupled to the memory and to the display, the processor configured to perform a method of servicing a machine having a service tag containing identifying information about the machine. The computing device where the computing device includes a tablet computer, a mobile phone, a smart device, or a laptop computer. Implementations of the described techniques may include hardware, a method or process, or computer software on a computer-accessible medium.

One general aspect includes a computer implemented method for health tracking of a machine in a system, including synchronizing machine data across a network of connected devices including at least a service tag on the machine, a remote computing device, and a remote server. The computer implemented method where synchronizing includes combining machine information from the service tag, the remote computing device, and the remote server. The computer implemented method where synchronizing also includes updating the machine information across the remote computing device and the remote server. The computer implemented method where synchronizing also includes updating the machine information to a latest iteration for any remote computing device accessing the machine via the service tag. Other embodiments of this aspect include corresponding computer systems, apparatus, and computer programs recorded on one or more computer storage devices, each configured to perform the actions of the methods.

Implementations may include one or more of the following features. A computer readable medium containing machine readable instructions for causing a computer to perform a method for health tracking of a machine in a system. A computing device, including a display; a memory; and a processor operatively coupled to the memory and to the display, the processor configured to perform a method for health tracking of a machine in a system. The computing device where the computing device includes a tablet computer, a mobile phone, a smart device, or a laptop computer. Implementations of the described techniques may include hardware, a method or process, or computer software on a computer-accessible medium.

One general aspect includes a computer implemented method for updating a knowledge base for a machine having a service tag containing machine specific information, the method including reading the machine specific information from the service tag with a computing device; accessing auxiliary information on the machine from storage of the computing device; accessing additional information on the machine from storage of a remote server; combining the machine specific information, the auxiliary information, and the additional information into a new set of machine information; and updating at least the auxiliary information on the computing device with the new set of machine information. Other embodiments of this aspect include corresponding computer systems, apparatus, and computer programs recorded on one or more computer storage devices, each configured to perform the actions of the methods.

Implementations may include one or more of the following features. The computer implemented method and further including synchronizing the new set of machine information to the storage of the remote server. The computer implemented method, and further including updating any additional remote devices that access the machine via the service tag with the new set of machine information. The computer implemented method, and further including updating any additional remote computing devices that access the computing device with the new set of machine information. A computer readable medium containing machine readable instructions for causing a computer to perform a method with any of the features above. A computing device, including a display; a memory; and a processor operatively coupled to the memory and to the display, the processor configured to perform a method with any of the features above. The computing device where the computing device includes a tablet computer, a mobile phone, a smart device, or a laptop computer. Implementations of the described techniques may include hardware, a method or process, or computer software on a computer-accessible medium.

One general aspect includes a computer implemented method for automatic health monitoring of a machine having a service tag containing machine specific information, the method including accessing an automated health alert generated for or by a machine from its service tag; scanning the service tag with a mobile computing device; and receiving at the mobile computing device the automated health alert. Other embodiments of this aspect include corresponding computer systems, apparatus, and computer programs recorded on one or more computer storage devices, each configured to perform the actions of the methods.

One general aspect includes a computer implemented method for obtaining service on a machine having a service tag with machine specific information, including scanning the service tag to obtain the machine specific information with a mobile computing device; selecting an icon in a graphical user interface for the machine on the mobile computing device for help and support; and connecting a user to machine specific support using the machine specific information. Other embodiments of this aspect include corresponding computer systems, apparatus, and computer programs recorded on one or more computer storage devices, each configured to perform the actions of the methods.

Implementations may include one or more of the following features. The method where connecting the user to machine specific support is accomplished without entering of information by the user. A computer readable medium containing machine readable instructions for causing a computer to perform a method with any of the features above. A computing device, including a display; a memory; and a processor operatively coupled to the memory and to the display, the processor configured to perform a method with any of the features above. The computing device where the computing device includes a tablet computer, a mobile phone, a smart device, or a laptop computer. The method where connecting the user to machine specific support includes providing information regarding machine history, maintenance, service, health status to a customer service support representative without entering of information by the user. Implementations of the described techniques may include hardware, a method or process, or computer software on a computer-accessible medium.

One general aspect includes a computer implemented method for updating code in a system, including providing a code update for a plurality of mobile computing devices at a remote server; updating code for any of the plurality of mobile computing devices that connect to the remote server; storing the code update on updated mobile computing devices; and updating code for a non-updated mobile computing device of the plurality of mobile computing devices when the non-updated mobile computing device connects to an updated mobile computing device. Other embodiments of this aspect include corresponding computer systems, apparatus, and computer programs recorded on one or more computer storage devices, each configured to perform the actions of the methods.

Implementations may include one or more of the following features. A computer readable medium containing machine readable instructions for causing a computer to perform a method for updating code in a system. A computing device, including a display; a memory; and a processor operatively coupled to the memory and to the display, the processor configured to perform a method for updating code in a system. The computing device where the computing device includes a tablet computer, a mobile phone, a smart device, or a laptop computer. Implementations of the described techniques may include hardware, a method or process, or computer software on a computer-accessible medium.

One general aspect includes a mobile application tool including instructions stored on a computer storage medium and operable through one or more hardware components of a computing device, including a graphical user interface for display of machine information for a specific machine, the machine information accessible via a service tag affixed to the machine, the graphical user interface including icons for access to machine specific information from the service tag, from auxiliary data on the machine stored in storage of the computing device and/or from additional data on the machine stored in storage of a remote server; where the icons include access to the machine information, including one or more of. The mobile application tool also includes serial #, part # s, date of manufacture, and other product label information for the machine. The mobile application tool also includes history of all service performed on the machine. The mobile application tool also includes interactive timeline of service events on the machine. The mobile application tool also includes documents related to service reports and output from past service events for the machine. The mobile application tool also includes past performance details and troubleshooting information for the machine. The mobile application tool also includes other service and operational information related to the machine. The mobile application tool also includes user manuals related to the machine. The mobile application tool also includes knowledge articles related to the machine. The mobile application tool also includes product notices related to the machine. The mobile application tool also includes video tutorials related to the machine. The mobile application tool also includes calibration certificates from both present and past for the machine. Other embodiments of this aspect include corresponding computer systems, apparatus, and computer programs recorded on one or more computer storage devices, each configured to perform the actions of the methods.

Implementations may include one or more of the following features. The mobile application tool where the icons further include access to service, part ordering, customer support, and scheduling thereof. Implementations of the described techniques may include hardware, a method or process, or computer software on a computer-accessible medium.

One general aspect includes a method of setting up a machine for later service on the machine, including affixing a service tag to the machine; providing the service tag with machine specific information retrievable by a remote device; and providing a remote device having a memory, a processor, and a display, the remote device configured to read the machine specific information from the service tag and integrate the machine specific information with auxiliary information about the machine that is stored on the remote device. Other embodiments of this aspect include corresponding computer systems, apparatus, and computer programs recorded on one or more computer storage devices, each configured to perform the actions of the methods.

One general aspect includes a method of servicing a machine having a service tag containing machine specific information, the method including scanning the service tag with a remote computing device to obtain the machine specific information; retrieving further machine specific information for the machine from storage of the remote computing device and/or from a remote server; integrating the machine specific information and the further machine specific information; and updating a profile of the machine with the integrated machine specific information and the further machine specific information. Other embodiments of this aspect include corresponding computer systems, apparatus, and computer programs recorded on one or more computer storage devices, each configured to perform the actions of the methods.

One general aspect includes a computer implemented method for obtaining service on a machine having a service tag with machine specific information, including selecting an icon in a graphical user interface on a mobile computing device for indicating that support is desired for an unspecified machine; after selecting, scanning the service tag of a specific machine to obtain machine specific information for the specific machine with the mobile computing device; and connecting a user to machine specific support for the specific machine using the machine information. Other embodiments of this aspect include corresponding computer systems, apparatus, and computer programs recorded on one or more computer storage devices, each configured to perform the actions of the methods.

One general aspect includes a testing machine, including an actuator; a fixture configured to engage a test specimen to conduct a test; a controller configured to control the actuator to conduct the test; and a service tag on a component of the testing machine such as the actuator, a hydraulic power unit, a hydraulic manifold, or accumulator; where the testing machine is configured to operate with the methods or machines according to any of claims Other embodiments of this aspect include corresponding computer systems, apparatus, and computer programs recorded on one or more computer storage devices, each configured to perform the actions of the methods.

Other aspects of the invention include a computing device, a system, and/or a mobile tool for implementing any of the method, machines, or computer readable media of earlier aspects.

BRIEF DESCRIPTION OF THE DRAWINGS

FIGS. 2A-2H illustrate further components of embodiments of the system of FIG. 1, and method embodiments for synchronizing and updating machine data.

DETAILED DESCRIPTION

Embodiments of the present disclosure are directed toward lab management and control. Specifically, embodiments of the present disclosure include solutions for, by way of example only, scheduling of service, tracking of health, status, calibration, and maintenance of systems (e.g., machines) in a laboratory. Such machines may include in one embodiment machines networked together, or may include individual machines that connect to and/or communicate with a network. Up to date information regarding an individual machine, or machines in a network, at a specific site, within a specific organization, and the like, is available to users, field service engineers (FSEs), and customer support representatives.

Information on each machine is kept up to date by a service tag on the machine, as well as supplemental data and information at other locations. The service tag contains information related to the specific machine, including for example model number, serial number, date of manufacture, and the like. Supplemental information about the machine, including for example, service history, maintenance history, calibration history, manuals, calibration certificates, health and status information, and the like may also be stored in a combination of service tag storage, storage on tablet devices of a customer or FSE, and remote storage such as on a server or in cloud storage. Access to the information, including the supplemental information, is synchronized between devices so that each device has access to the entire set of information for the machine.

Embodiments of the present disclosure also provide the ability to schedule maintenance and service, order parts, enter new information about a machine or machines, and synchronize the information to multiple devices across multiple platforms.

Embodiments of the present disclosure include the ability to operate using a digital, integrated lab experience with a streamlined way to run a lab and to interact with experts in the machines of the lab. For example, embodiments of the present disclosure include facilitation of direct contact with a Customer Care Center, in which a user or technician may ask a question to a machine expert on an Expert Network. Further, connection using embodiments of the present disclosure provide for automatic communication of user information, specific machine information, history of service and operation, and the like. The ability to have this information available on a machine simply by accessing its service tag allows a FSE, customer, or customer service representative, to save time and effort in diagnosing or fixing issues, scheduling maintenance, and speeding customer support using an appropriate expert without any entry of machine information or history.

Figure 1:
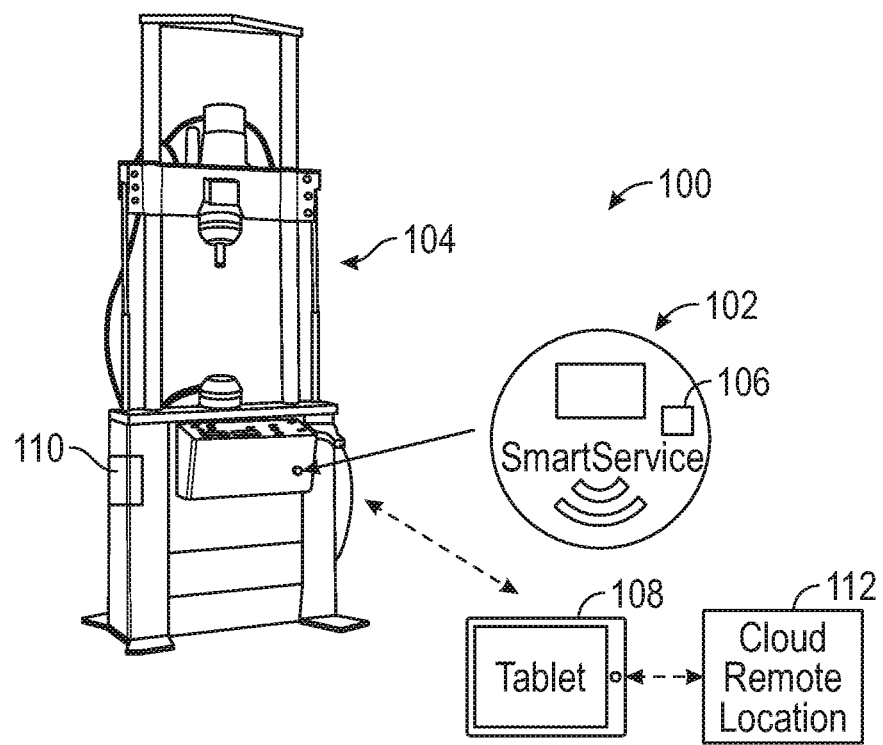
FIG. 1 illustrates an embodiment of a machine and service tag according to an embodiment of the present disclosure.

FIG. 1 is a diagram of a system 100 according to an embodiment of the present disclosure. System 100 includes a service tag 102 that is positioned or placed on a machine in a laboratory, for example machine 104. Service tag 102 in one embodiment includes a near field communication (NFC) chip 106 that may communicate with a user device 108, such as a tablet computer, smart device or smart phone, laptop, or the like. Equipment such as machine 104 is tagged with the service tag 102 having the embedded NFC chip 106 inside of it. The service tag 102 stores information relating to the machine 104 to enable a digital record information of all service, maintenance, health status, and the like performed on that machine 104.

In one embodiment, operation of the system includes a field service engineer (FSE) or other technician setting up a new service tag 102 by adhering it to a machine 104 to be associated with the tag 102. In one embodiment, a photograph is taken of a product label 110 for the machine 102. In one embodiment, the product label 110 is parsed, such as with optical character recognition, a bar code, a QR code, or the like, to extract specific information about the machine 104, such as, for example, model #, serial #, date of manufacture, etc. The FSE may verify, add, and/or correct this information to create a new digital representation of the Product Label 110. A picture may also be taken of the machine 104 itself, and a customer friendly name (like "Loadframe 5") may also be assigned. The tag 102 is associated with the information, such as by tapping the tag 102 to tie all of this information with the tag 102, or by writing the information to the service tag 102.

A service tag such a tag 102 may be of a type other than an NFC chip. The service tag 102 may be, by way of example only and not by way of limitation, a QR code, barcode, or Bluetooth device. In the case of a QR code or barcode, data is not written to the service tag 102. In this case, information is encoded in the QR code or barcode up-front. This may be a generic unique identifier or be customized to the specific system or machine 104. Additional data may then be stored as auxiliary data when no additional data can be written to the QR code or barcode.

In the case of a Bluetooth or similarly powered device, the service tag 102 may act similar to a NFC tag or QR code in that it can optionally be writeable. If it is, then certain data can be stored on the service tag 102. If it is not, then no additional data is stored on the service tag 102 and all additional data is stored as auxiliary and/or additional data.

Once the associations are made between a machine 104 and its service tag 102, the information may be written to the tag 102 and/or stored as auxiliary data tied back to the tag, for example on storage 109 of the tablet 108 or at a remote location, such as a cloud storage 112.

Once the information is stored and associated with a tag 102 for the machine 104, a digital representation of the machine 104 exists that allows a manufacturer or rep (such as a FSE) and a customer to interact regarding the machine 104, and to store additional information about the machine 104 to storage, such as storage 109 on a tablet 108, on the service tag 102, and/or on remote storage 112.

While retrofitting machines such as machine 104 may be done with embodiments of the present disclosure, it should also be understood that new equipment may also have a service tag 102 attached and configured at the time of manufacture, such that the new machine is already set up by the time it ships to the customer.

Figure 2A:
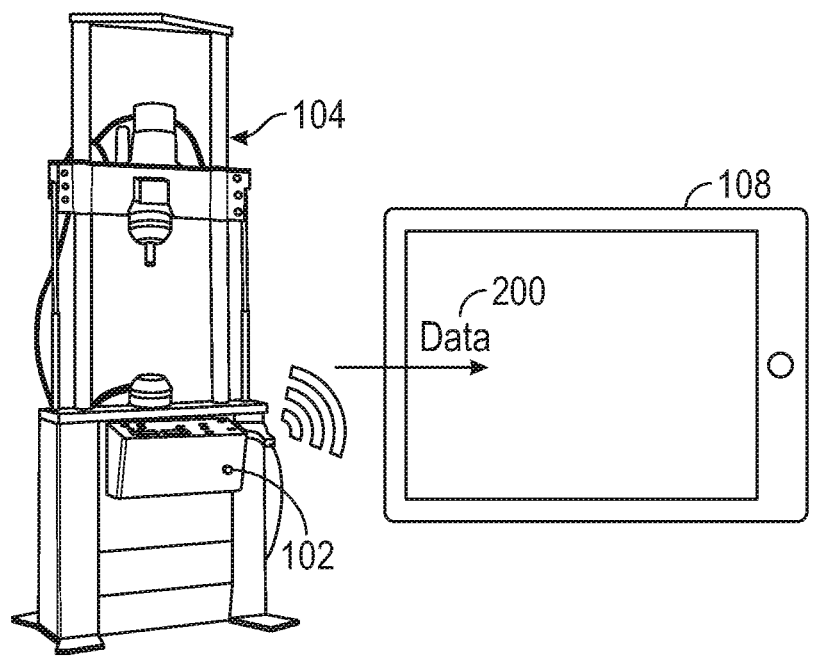

A system 100 and operation of embodiments of the system 100 is shown in FIGS. 2A-2H. In FIG. 2A, a FSE, manufacturer representative, or the like is in the field to attend to a machine 104. The FSE approaches machine 104, which has a service tag 102 associated therewith, using a tablet or other mobile computer (such as tablet 108). The tablet 108 reads data 200 from the service tag 102.

Figure 2B:
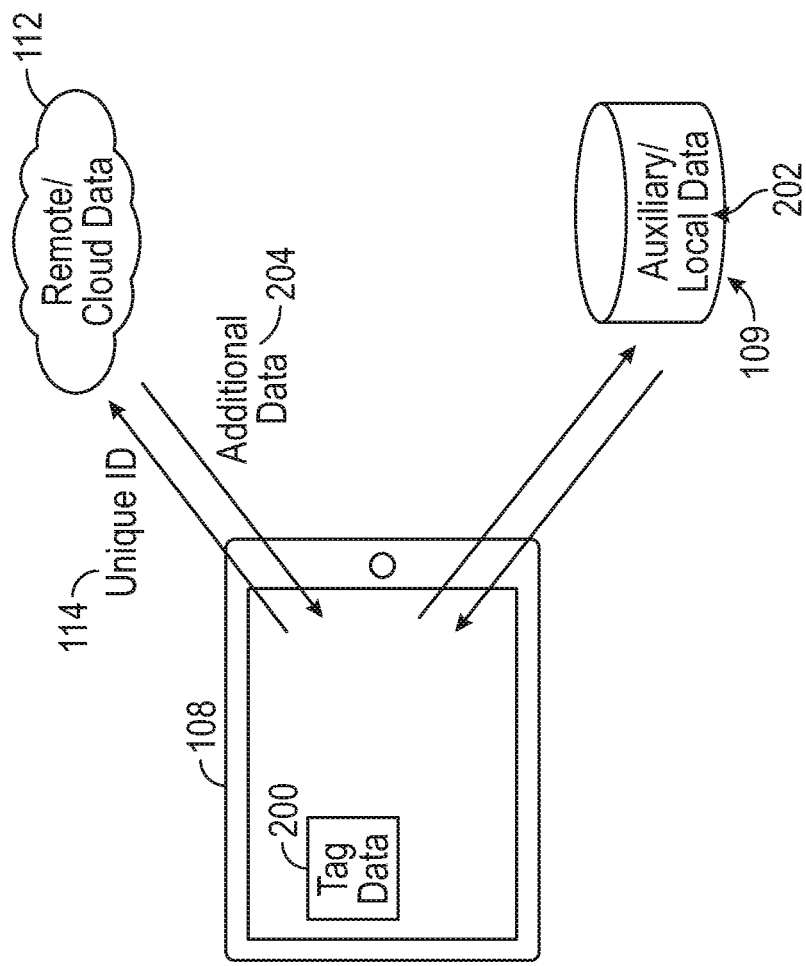
Figure 2B:
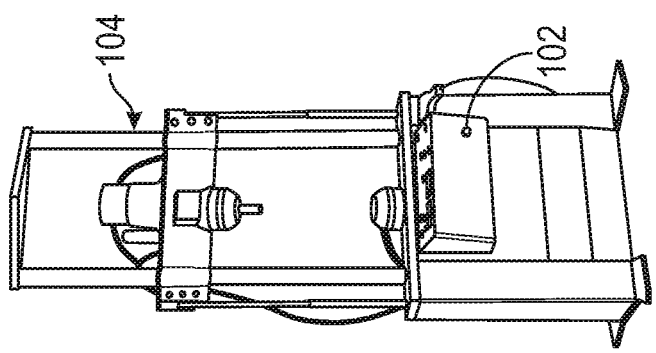

In FIG. 2B, the tablet 108 uses tag data 200 transferred from or read from the service tag 102, including in one embodiment a unique ID 114 for the machine 104, to look up any auxiliary/local data 202 that is stored in tablet storage on the tablet, and/or additional data 204 stored remotely in cloud storage 112. Additional data 204 and auxiliary data 200 is partially, in one embodiment, data associated with the specific service tag 102 and/or machine 104, and partially may be data associated with the type of machine 104, such as a knowledge base or the like for that specific machine, or for that type of machine 104. This additional data 204 and auxiliary data 202 supplements the data on the tag 102, allowing for a greater amount of information to be available for the machine 104 than is capable of storage on the service tag 102.

Figure 2C:
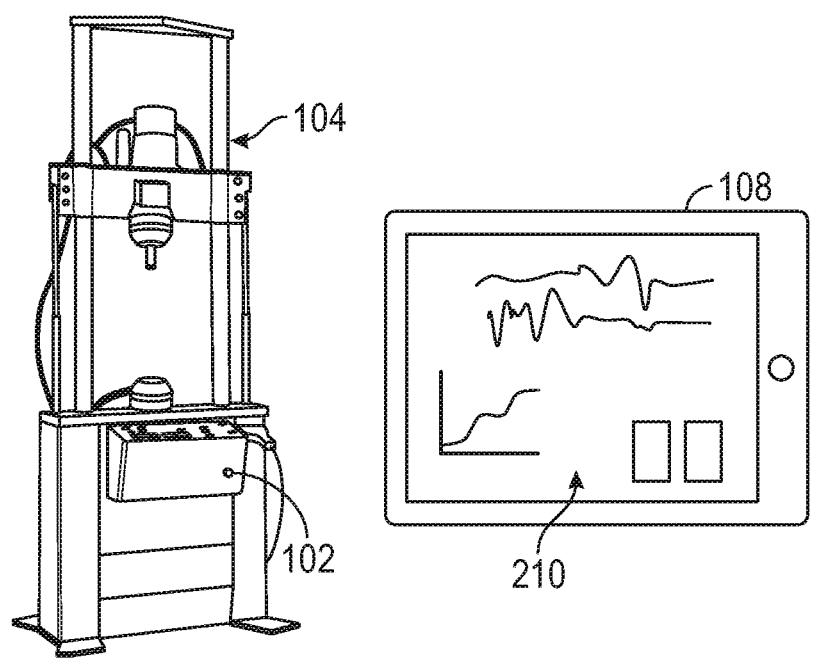

In FIG. 2C, the data 200 from the service tag 102, plus any auxiliary data 202 from local storage and/or additional data 204 from remote storage is used to show the user a combined set of information 210 about the machine 104. This information is displayed in one embodiment on a suitable display in the form of a graphical user interface (GUI), where a user using a pointing device such as a mouse, pen or even just even a finger (if the display includes a touch sensitive screen) may interact with graphical images of the combined set of information 210 to navigate within the GUI, or within an application running on the table 108*t*. This information may include one or more of the following:

Serial #, Part # s, Date of Manufacture, and other Product Label information for the machine 104

History of all service performed on the machine 104

Documents related to service reports and output from past service events for the machine 104

Past performance details and troubleshooting information for the machine 104

All other Service and operational information related to the machine 104

User Manuals related to the machine 104, such as operational manuals or service manuals Product notices related to the machine 104 such as new features, safety notices, recall notices, or end-of-life notices Video tutorials related to the machine 104, such as how-to videos, informational videos, tutorial videos, troubleshooting videos, etc.

Calibration certificates from both present and past for the machine 104

Figure 2D:
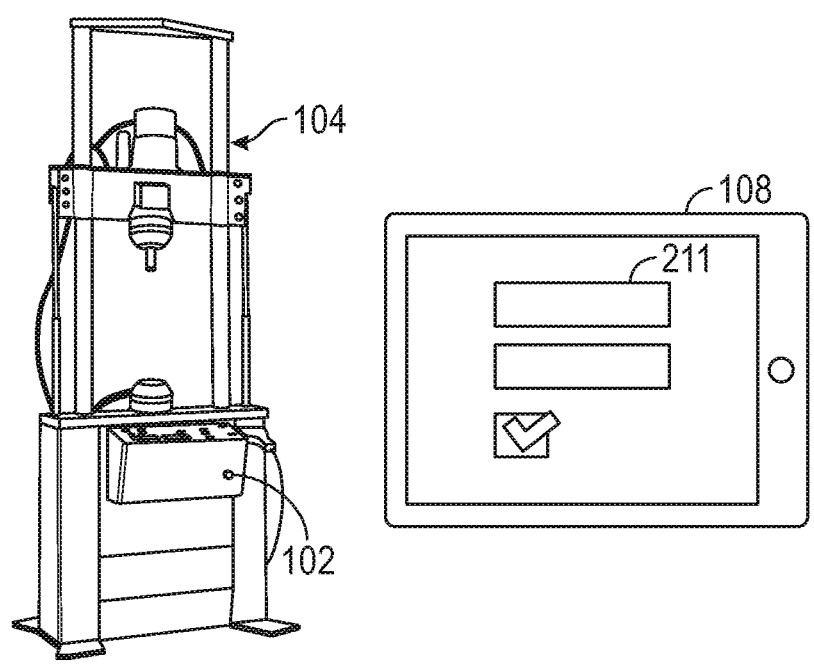

In FIG. 2D, a user or FSE has accessed the data from a service tag 102 for a machine 104, plus, potentially, auxiliary data 202 and/or additional data 204. The tablet 108 contains software and other tools that may be used by the user or FSE to perform service, using the service tag 102 digital information to assist in the service. Since the service tag 102 contains information, or can retrieve further information, about the specific machine 104, no manual re-entry of machine 104 information or any other existing entered information is performed. Instead, the information is available, reducing service access time and effort.

Information stored on the service tag 102, or associated with machine 104 or service tag 102, including auxiliary data 202 and additional data 204, may be used to improve tools when entering new information for machine 104. The information available in the various forms of data associated with the machine 104 and/or service tag 102 allow an entire service history for the machine 104 to be accessible to the FSE (shown as list 211) to aid in performing service or maintenance on the machine 104. Further details about maintenance are discussed elsewhere herein.

In FIG. 2E, a process for supplementing the data 200, auxiliary 202, and/or additional data 204 for a particular machine 104 is shown. New information about the machine, such as service information, maintenance information, calibration information, and the like, may be generated during a FSE or user visit to the machine 104. Such new information is associated with the machine 104, and, accordingly, is stored on one or more of the service tag 102 as shown at arrow 220, as auxiliary data 202 on the tablet as shown at arrow 221, and/or as additional data 204 in remote storage 112 as shown at arrow 222.

Depending on the data type and size, data is stored back directly to the service tag 102 (arrow 220), stored locally on the tablet 108 (arrow 221), or stored remotely on another device/server/cloud service 112 (arrow 222). When the service tag 102 is scanned again, all the data, regardless of where it is stored, is accessible at the tablet 108.

Figure 2F:
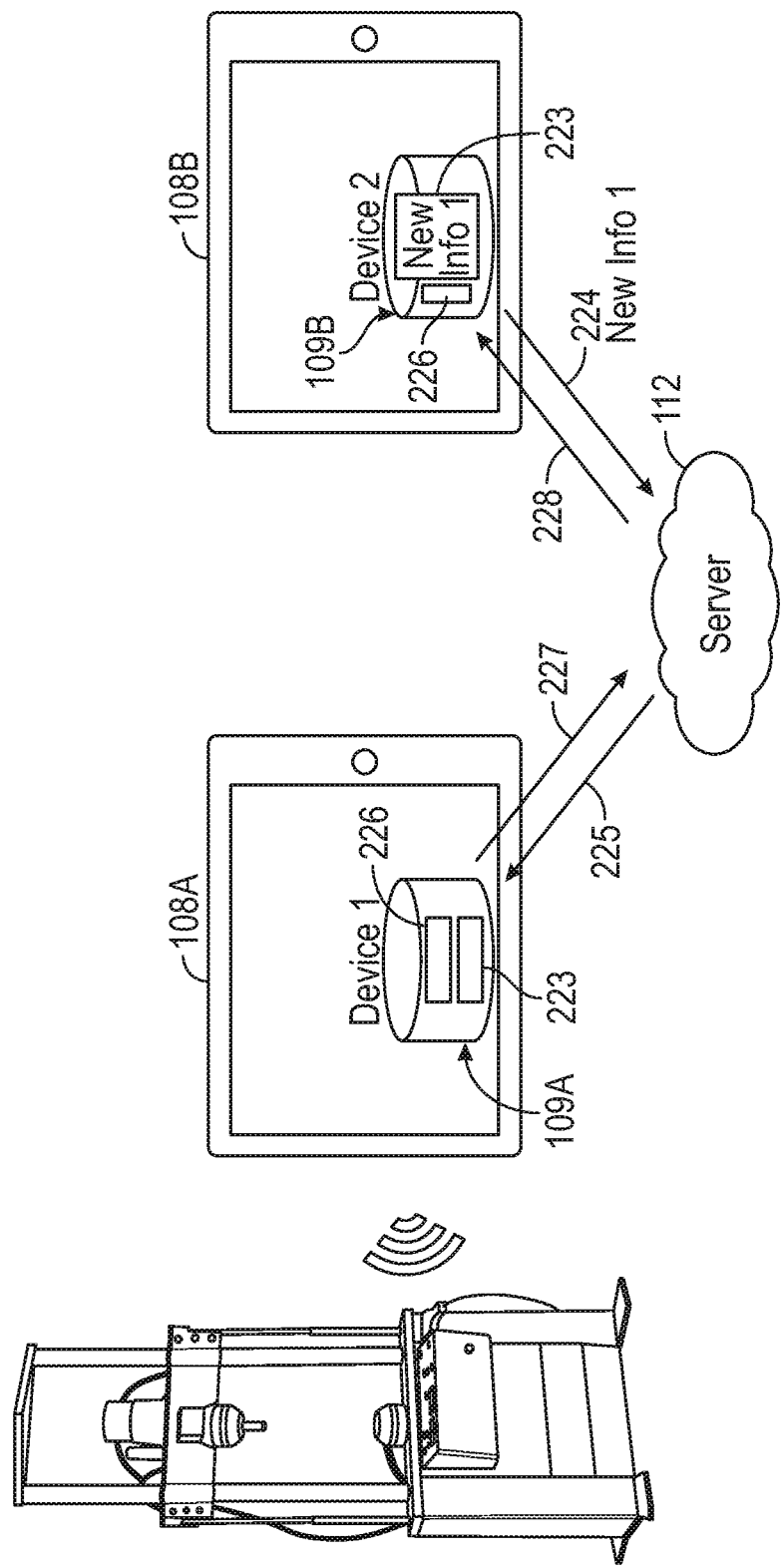

As shown in FIG. 2F, specific tablet 108B may have new information 223 for machine 104, such as from a previous service visit by a FSE using tablet 108B, stored in storage 109B. This new information 223 is uploaded or otherwise communicated to the remote/cloud storage 112 at arrow 224. However, the same tablet may not be available at a later maintenance or service visit. When a tablet 108A is used for accessing or changing information for a specific machine 104 associated with a service tag 102, it may be used at a later time to access the information about machine 104 associated with service tag 102, despite not having been used to previously access that data via service tag 102. In this situation, tablet 108A retrieves new information from remote server 112 as shown at arrow 225, storing new information 223 in local storage 109A. When further new information 226 is obtained from machine 104 by tablet 108A, that new information 226 is uploaded to remote storage 112 at arrow 227, and can be retrieved by tablet 108B (and all other tablets in the system/organization) from remote storage 112 as shown at arrow 228, to store the new information 226 in storage 109B of tablet 108B. In this manner, all devices in a system, or in an organization, have access to all information and data related to each machine 104 having a service tag 102.

All data is therefore synced between devices on a system so that each of N devices (108A, 108B, . . . , 108N) that scans a tag 102 has all the information associated with the machine 104 bearing the service tag 102. By default in one embodiment, all locally generated data is mirrored directly to a remote server 112. Other devices may then download the data to have an exact local copy of all auxiliary tag data 202 as desired. Auxiliary data created on an offline device (e.g., a device without an internet connection, or a device that does not have an internet connection at the time the data is generated or stored to the device) may be periodically synchronized to the remote storage.

As shown in FIG. 2G, auxiliary data created on an offline device (e.g., a device without an internet connection, or a device that does not have an internet connection at the time the data is generated or stored to the device) may be communicated to other devices through periodic synchronization via a local connection to another device. In this type of synchronization, communication between devices 108A and 108B may be, for example only and not by way of limitation, by Bluetooth, Wi-Fi Direct, Direct Connection (Ethernet, USB), Local Network Connection, or the like.

In FIG. 2G, device 108A is in communication with machine 104 and service tag 102. Device 108A is offline. Using a local connection 230 between device 108A and device 108B, which is online, new information available at the remote storage 112 may be communicated to offline device 108A, and new information generated by offline device 108A may be communicated to the remote storage 112. In operation, the offline device 108A looks for another device within range to exchange data with. Data exchange may be made between the devices as follows.

Once a connection is established between device 108A and device 108B, device 108A sends any newly created data or information 231 via connection 230 to device 108B. This information 231 is routed to the remote storage 112 by device 108B as shown in arrow 232. At this time also, device 108B retrieves new information 234 associated with tag 102 of machine 104 that device 108A may not have, from remote storage 112 as shown at arrow 233, and communicates it via communication link 230 (at arrow 235) to device 108A.

While a connection to the remote storage 112 by device 108B at the time it receives new information 231 from device 108A may be desirable, it is also possible that device 108B does not have an internet connection at the time it is locally connected with device 108A. In this case, the latest information that either device 108A or 108B has that is associated with machine 104 via service tag 102 is communicated to both devices 108A and 108B so that each device 108A and 108B has the latest information available. The one of the devices 108A and 108B that has most recently connected with the remote storage 112 will have the latest version of data available from the remote storage 112, so that once the devices 108A and 108B connect to each other, each will have the latest version of the information possible between those two devices. Once one of the devices 108A and 108B connects to the remote storage 112 at some later point, that device uploads its newest version of the data so all other devices will have access to the up-to-date data.

Figure 2H:
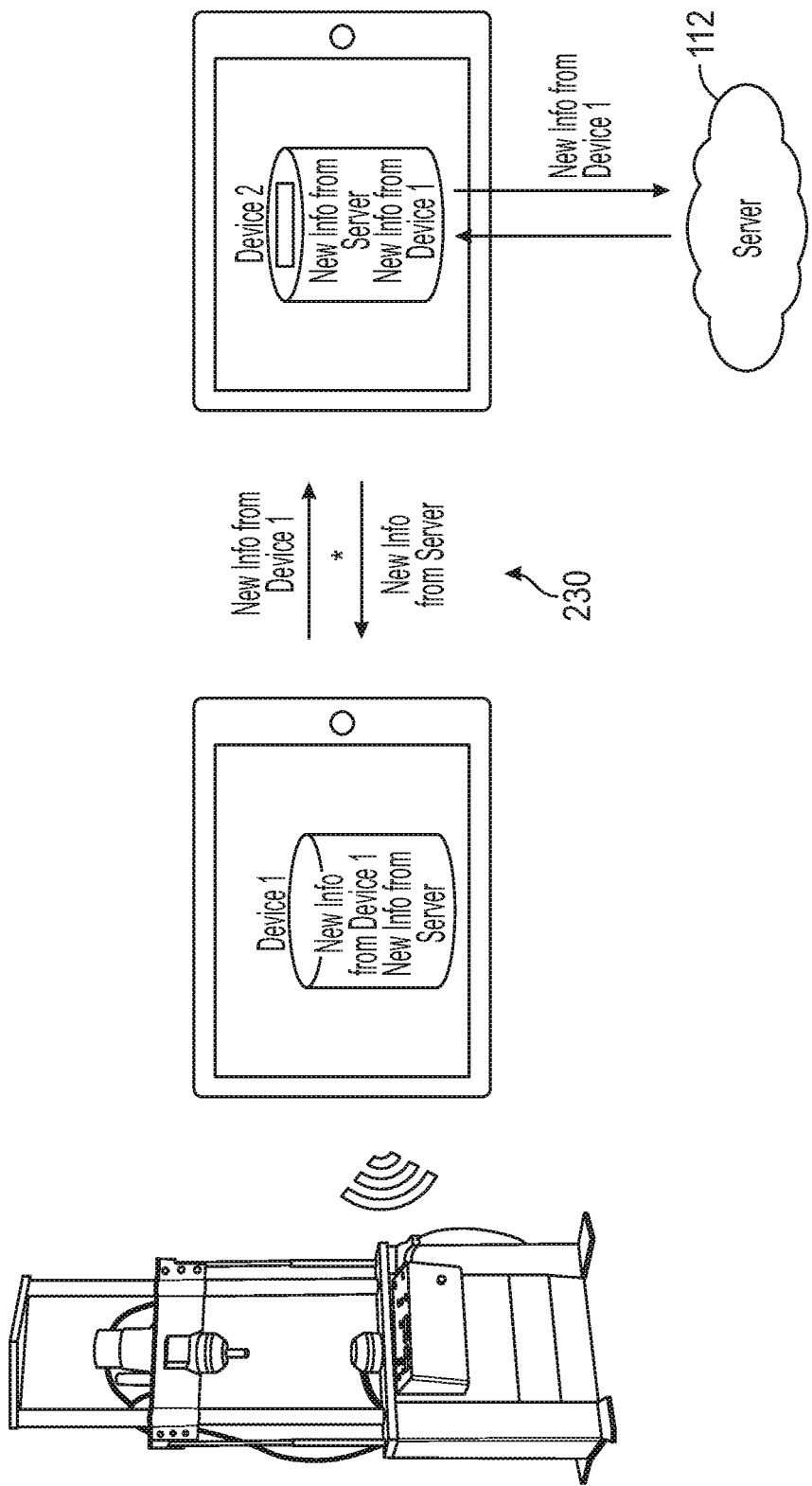

As shown in FIG. 2H, neither device 108A nor device 108B is connected to the internet. Device 108B not being connected to the internet still allows synchronization to device 108A with the information available on device 108B. In this case, device 108B has the latest information available from the remote storage 112, obtained for example during a previous synchronization of device 108B with the remote storage 112. When device 108B locally connects to device 108A, device 108B receives updates from device 108A, and transfers, such as via communication link 230, any data it has, on service tag 102 and associated machine 104, and any other machine and tag associated with device 108A that device 108A does not yet have. At a later time, when device 108B reconnects to remote storage 112, the new data from device 108A is uploaded to the remote storage 112. This allows offline devices to remain up-to-date despite not connecting directly to a remote storage 112.

In some instances, new information that should be stored on a service tag 102 is not able to be stored. This can occur for several different reasons. In such circumstances, a delayed writing of information to the service tag 102 is performed in one embodiment. When new information is created or modified that should be stored on the NFC tag, but cannot be written immediately, embodiments of the present disclosure write the information to the tag 102 on the next scan event. Information can be transmitted like auxiliary data between devices. Information may then be used by those devices as if it were already written to the tag.

The next time a device is close enough to scan and communicate with the specific service tag 102, any unwritten data intended for the tag 102 can be written to the tag 102 at this time. Data is then marked written and indicated to other devices that the data no longer needs to be written.

Methods of delayed writing of data according to embodiments of the preset disclosure allow flexibility in terms of modifying data or information, or adding information to, a service tag without having a direct connection to the tag at the time of updating of the information.

Operations relating to other functionality according to embodiments of the present disclosure are shown in greater detail in FIGS. 3A-3F.

Figure 3A:
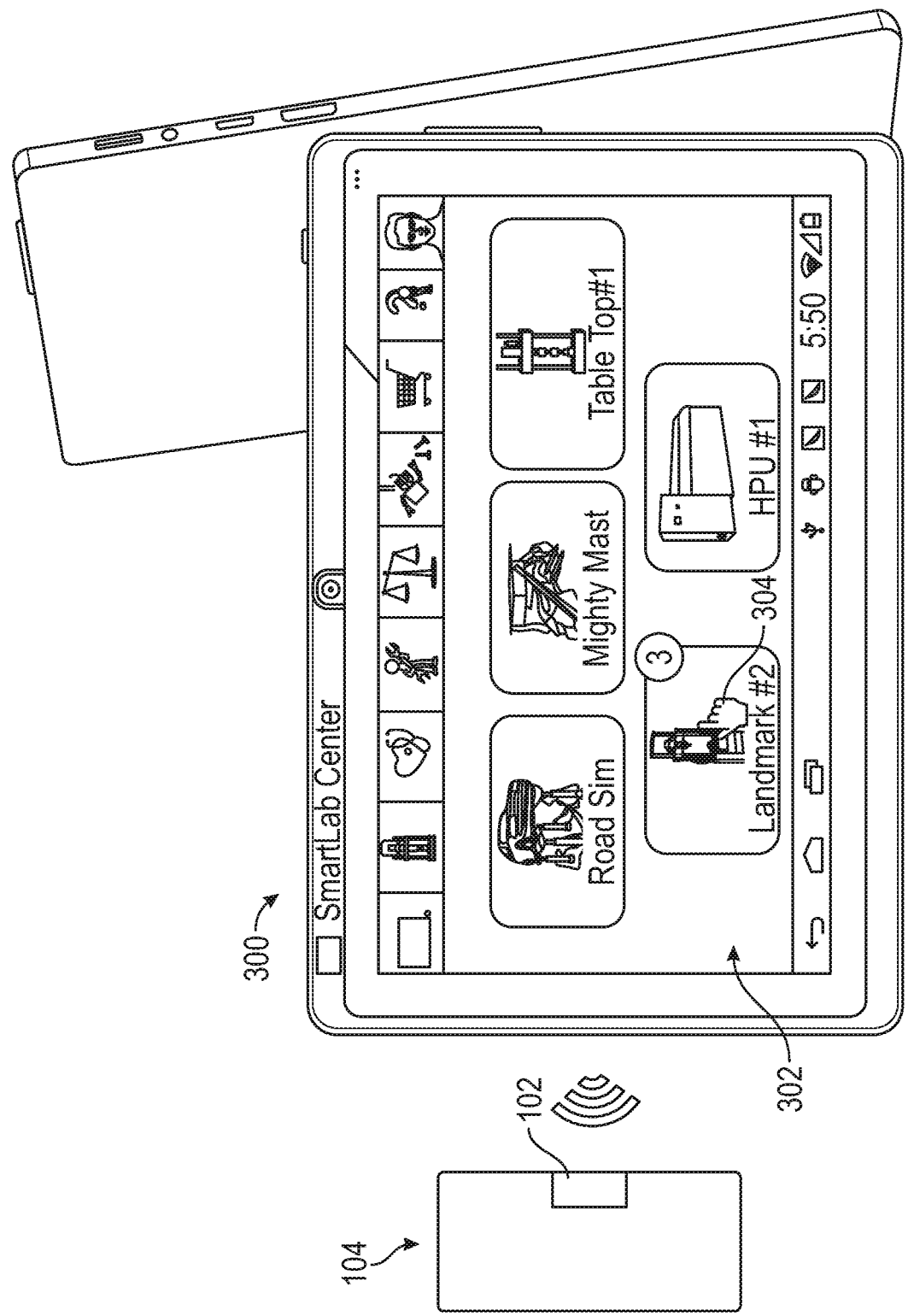
FIGS. 3A-3F illustrate further operational embodiments of functions of the present disclosure.
Figure 3B:
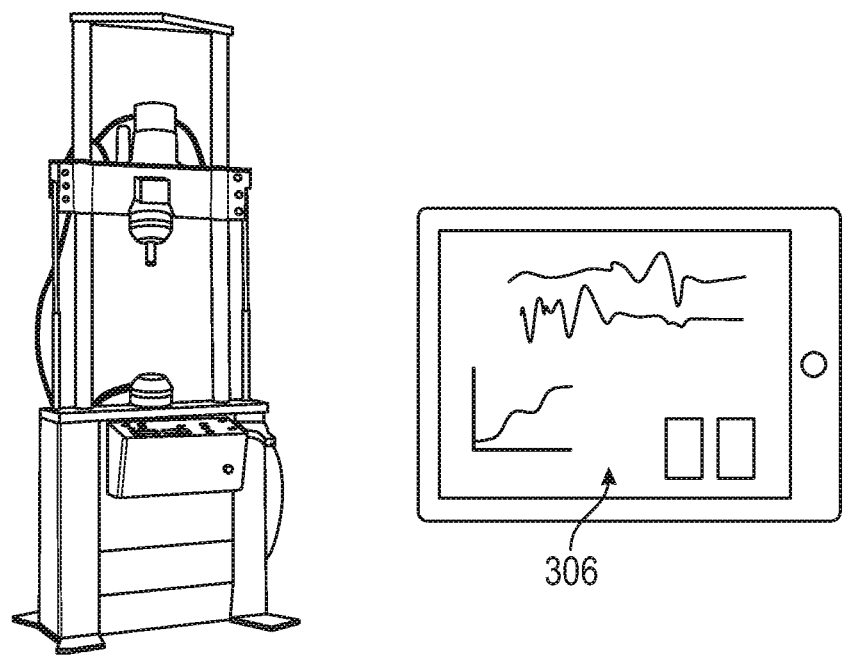

In FIGS. 3A-3B, a lookup function for all service related to a particular machine (such as a machine 104 associated with a service tag 102) is shown. In this embodiment, in addition to FSE tablets, a customer is also provided a tablet 300 which is similar in functionality to tablet 108 described above. Tablet 300 is functional to scan a tag such as service tag 102 to obtain information related to the service history of that particular machine 104. Examples of information available to the customer tablet 300 include by way of example only, but not by way of limitation:

Serial #, Part # s, Date of Manufacture, and other Product Label information for machine 104
History of all service performed on the machine 104
Documents related to service reports and output from past service events for machine 104
Past performance details and troubleshooting information for machine 104
All other Service and operational information related to machine 104

Tablet 300 may also contain software and/or firmware for display of multiple machines associated with a particular location or site, such as a laboratory that contains multiple machines. The software may display representations 302 of various machines in the laboratory. Each individual machine may be selected, such as with a selection cursor or the like as shown at 304, to review information about the individual machine. FIG. 3B shows the various metrics and information 306 available about the individually selected machine.

Figure 3C:
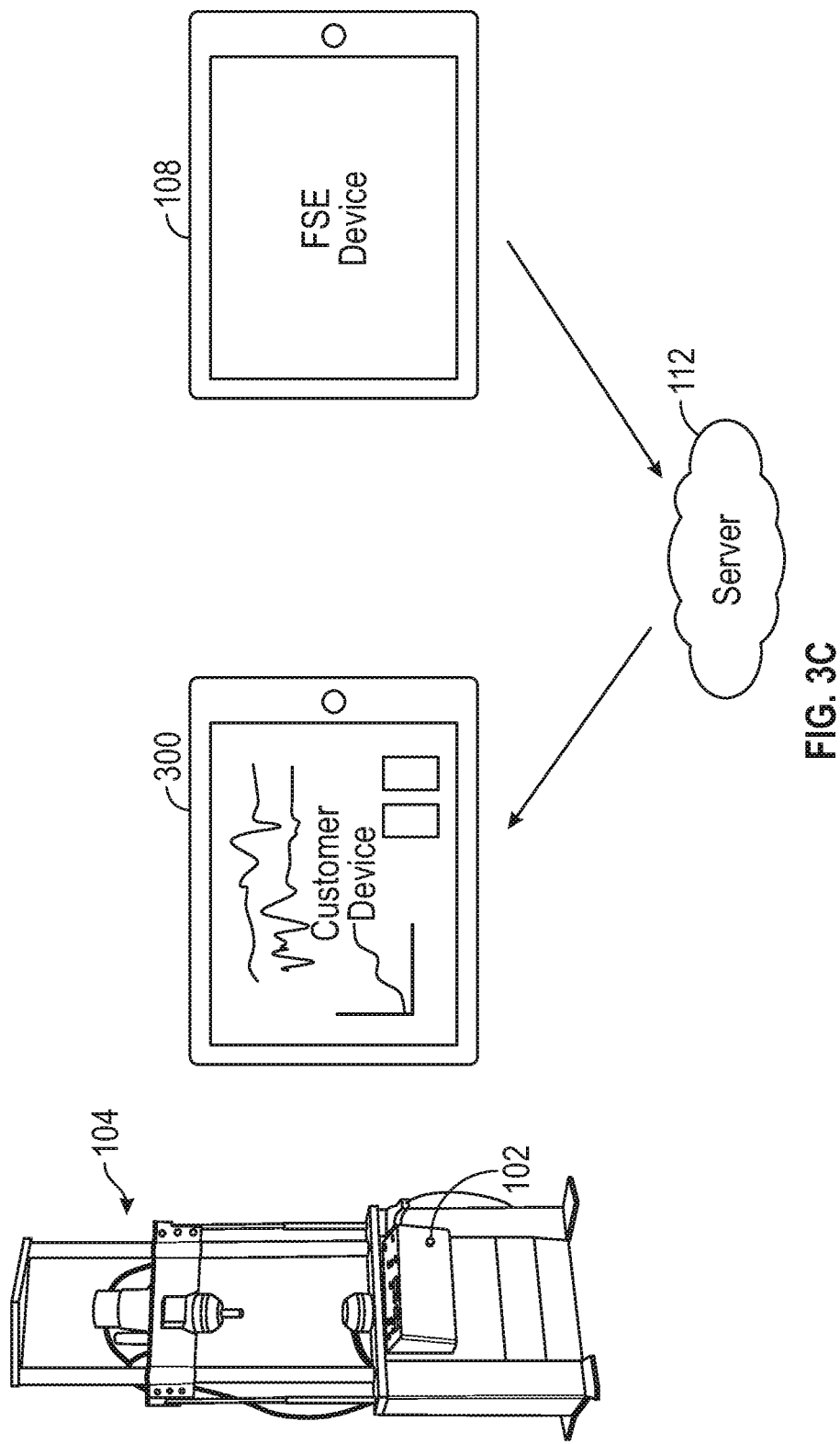

As shown in FIG. 3C, the customer tablet 300 is also connectable to a remote storage 112. When connected to remote storage 112, additional data such as data 204 may be retrieved from remote storage 112. Such data may be uploaded to remote storage 112 from a FSE tablet such as tablet 108, so that information related to service tag 102 ad machine 104 that was updated during a FSE visit is available to the customer tablet 300 upon its connection to the machine 104 associated with service tag 102.

Figure 3D:
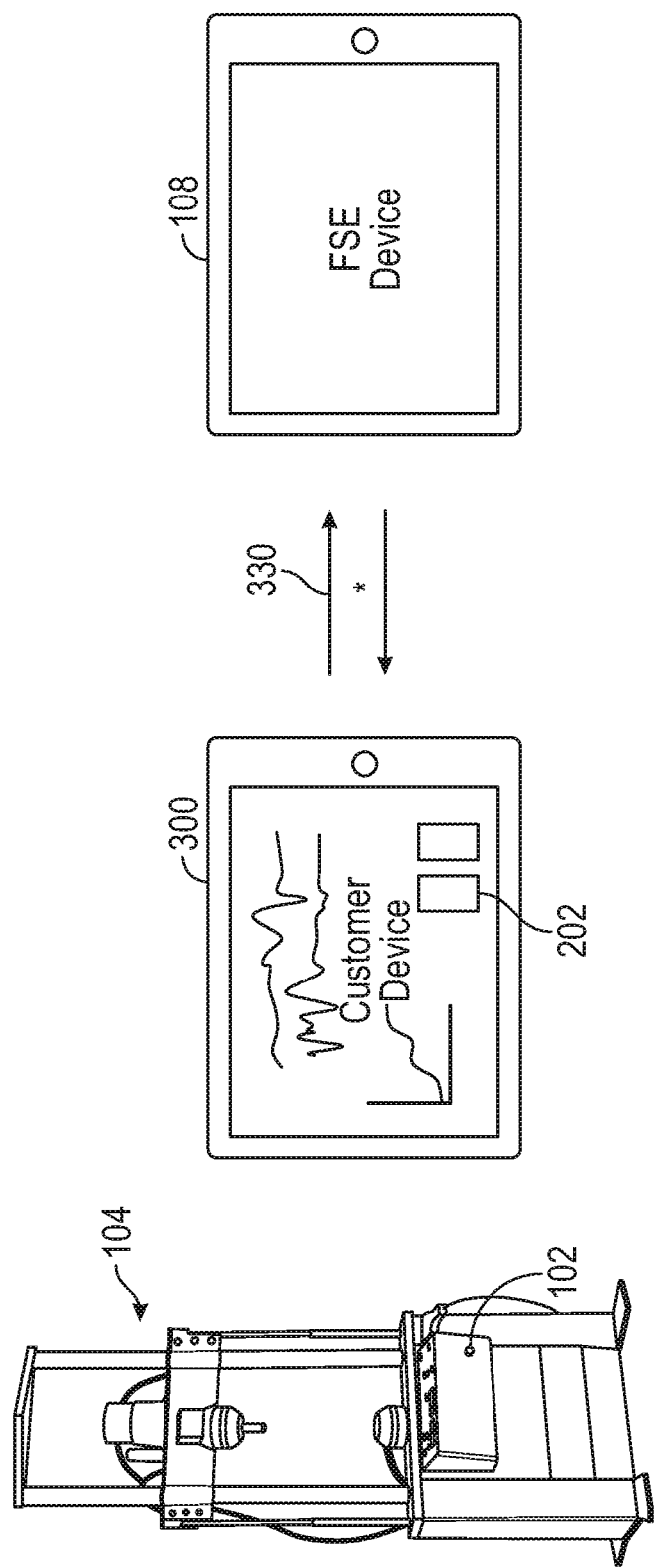

Similar to the process for updating a FSE tablet 108, customer tablet 300 may also be updated even if it is offline. As is shown in FIG. 3D, a customer tablet 300 is offline. Some data may be obtained on machine 104 by reading the tag data on service tag 102. Further, auxiliary data (such as data 202) may be updated through a connection 330 between customer tablet 300 and FSE tablet 108. The connection between tablets 300 and 108 is similar to that described above between tablets 108A and 108B. In this situation, where tablet 300 is offline, auxiliary data 202 gets updated periodically from other devices such as tablet 108 using the Device-to-Device sync method described previously. In one embodiment, the updating device will be a FSE's device 108 that is on-site for service and/or maintenance. As has been described above, communication between devices (e.g., between devices 300 and 108) may be, for example, by Bluetooth, Wi-Fi Direct, Direct Connection (Ethernet, USB), Local Network Connection, or the like.

While FSEs and machine manufacturers are typically the primary creators of data and information, as they are most commonly impacting the service history of a system, customers can also add new content. Potential examples of customer updates include, by way of example only and not by way of limitation, a customer performing service without a FSE or a customer modifying the machine 104 or aspect of the machine 104, a fixture, or the system with which it is associated.

Figure 3E:
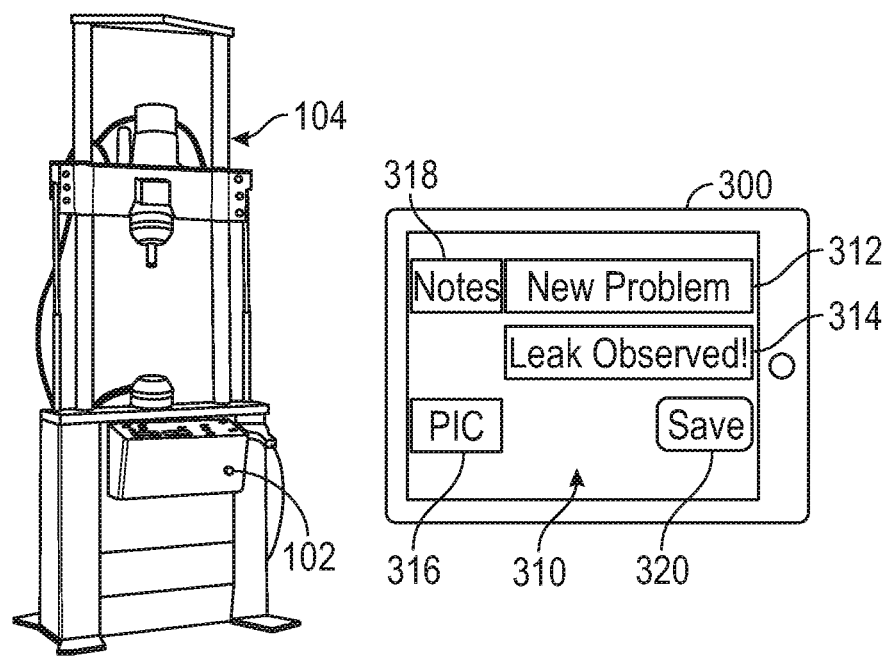

When such a customer modification to the data or machine information is made, the customer works with software and/or firmware, such as through a graphical user interface (GUI) 310, on the tablet 300 for the entering or modification of information. For example, as shown in FIG. 3E, a customer records a new problem by selecting a new problem entry icon 312, which further allows entry of problem information such as a description 314 of an observation about a maintenance problem (it started rattling on a certain date, a small leak was observed starting on another or the same date, etc.) Pictures 316 of the problem can be attached. A further description of exactly what the problem is, or notes about it that are not enterable on a specific type of entry, may be entered in a notes field 318. When all information is entered, the new information may be saved using a save button 320 of the GUI 310.

Figure 3F:
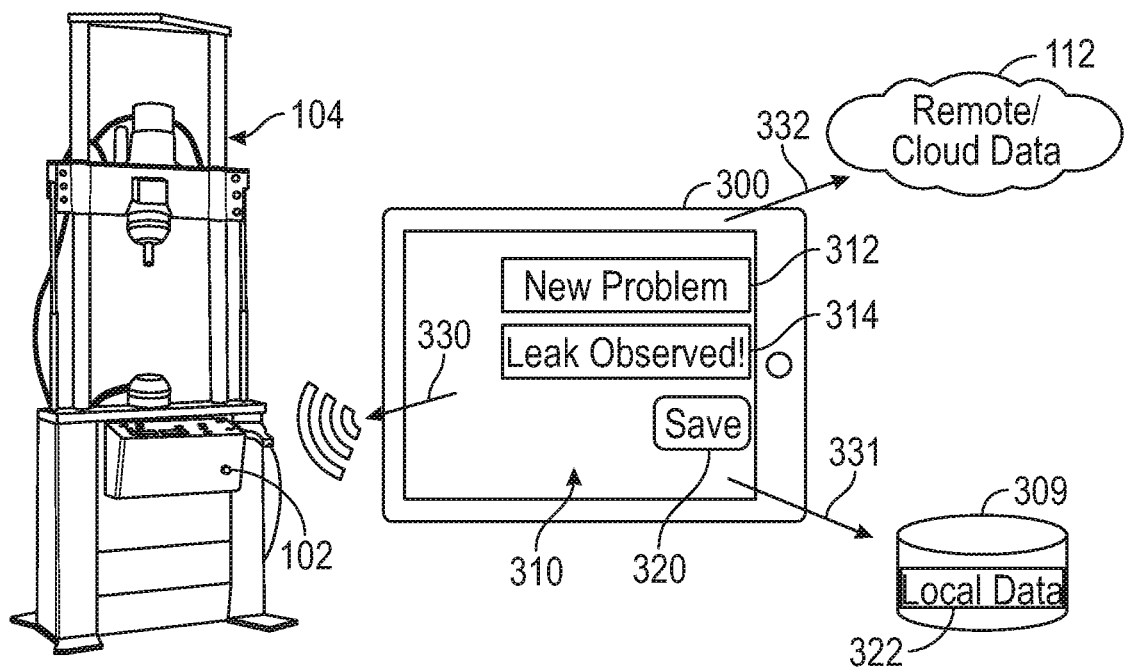

A method for storing new customer information to the service tag 102 or to remote storage 112 is shown in FIG. 3F. The location of the storage of the new customer generated information is determined depending on the data type and size. New customer entered information is stored as local data 322 by communication to the service tag 102 as shown at arrow 330, to auxiliary storage 309 of customer tablet 300 as shown at arrow 331, or to additional data storage on remote or cloud storage 112 as shown at arrow 332. This way, when the tag 102 is scanned again, the data will be accessible.

In one embodiment, service tag information for all machines in a system are stored locally on customer tablets 300, FSE devices 108, and remote storage 112. In case a customer or FSE wishes to access information but is not present in the vicinity of the service tag, a customer or FSE can access information as follows. For example, a customer or FSE may wish to view information when the customer or FSE are not physically present in the lab or in front of the particular machine 104. Through the synchronization methods described herein, and using the GUIs described, a user with a customer tablet 300 or a FSE with a tablet 108 may easily look up information related to a particular service tag 102, machine 104, or multiple machines in a lab. Therefore, information is accessible even when not directly in front of the system.

Figure 4A:
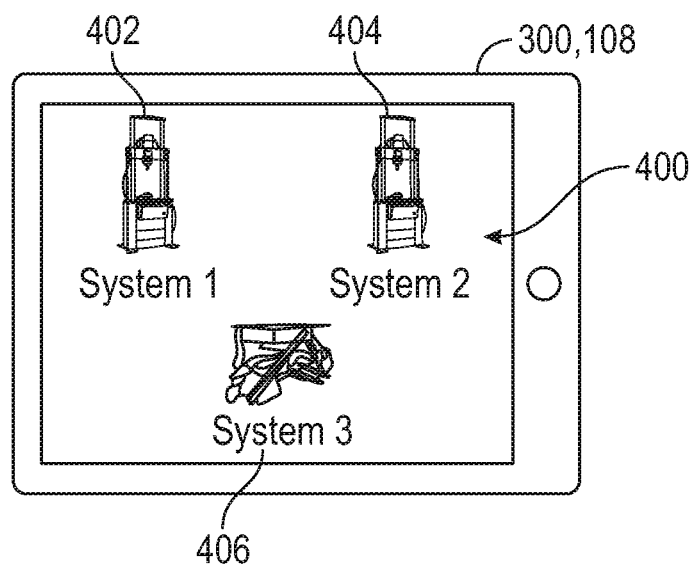
FIGS. 4A-4B illustrate an embodiment of a graphical user interface according to another embodiment.
Figure 4B:
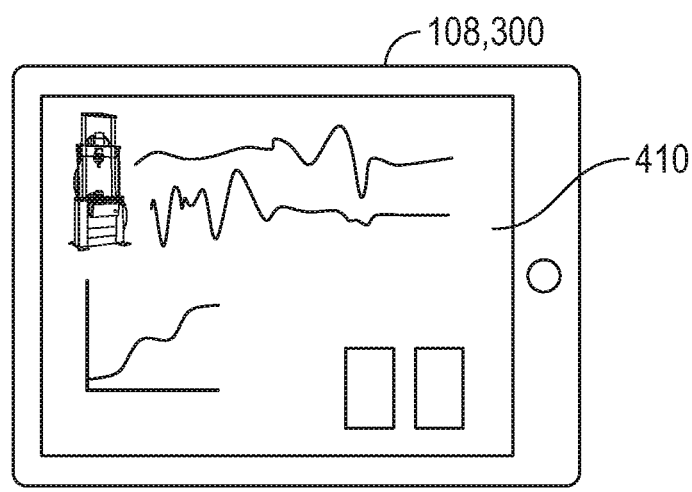
Figure 4C:
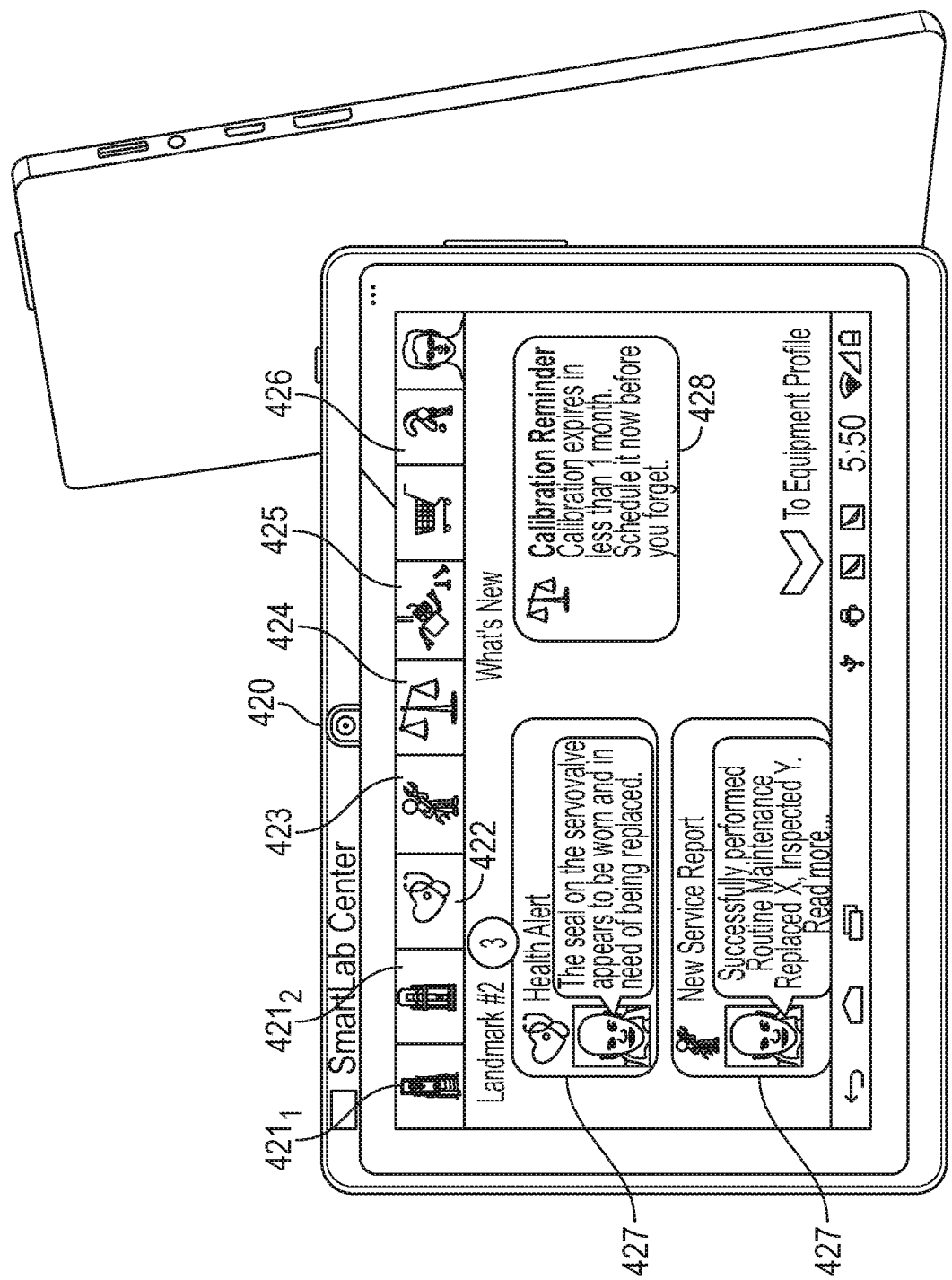
FIGS. 4C-4J illustrate representative screens of a graphical user interface according to other embodiments.

Referring to FIG. 4A, a tablet 108, 300 is shown, on which a GUI 400 showing a plurality of machines or systems 402, 404, and 406 are identified with icons. The machines or systems 402, 404, 406 are in one embodiment each equipped with a service tag having associated information and/or data on the service tag, in the tablet 108, 300, and/or in storage on remote storage 112. Selection of the icon for one of the machines allows a user to view system information 410 for that machine, as shown in FIG. 4B.

Because of the synchronization across multiple platforms of information pertaining to each machine 402, 404, 406, etc. in a system, data and information is available without being physically present at the machine. In one embodiment, this is achieved by caching tag data for the machines in a lab or system (e.g., machine 402, 404, 406) from a scan of those individual machines, and store at least the information regarding the service tag data for each of the machines. This tag data may also be synchronized to other devices, such as additional customer or FSE tablets, as described previously for auxiliary and/or additional data.

Figure 4D:
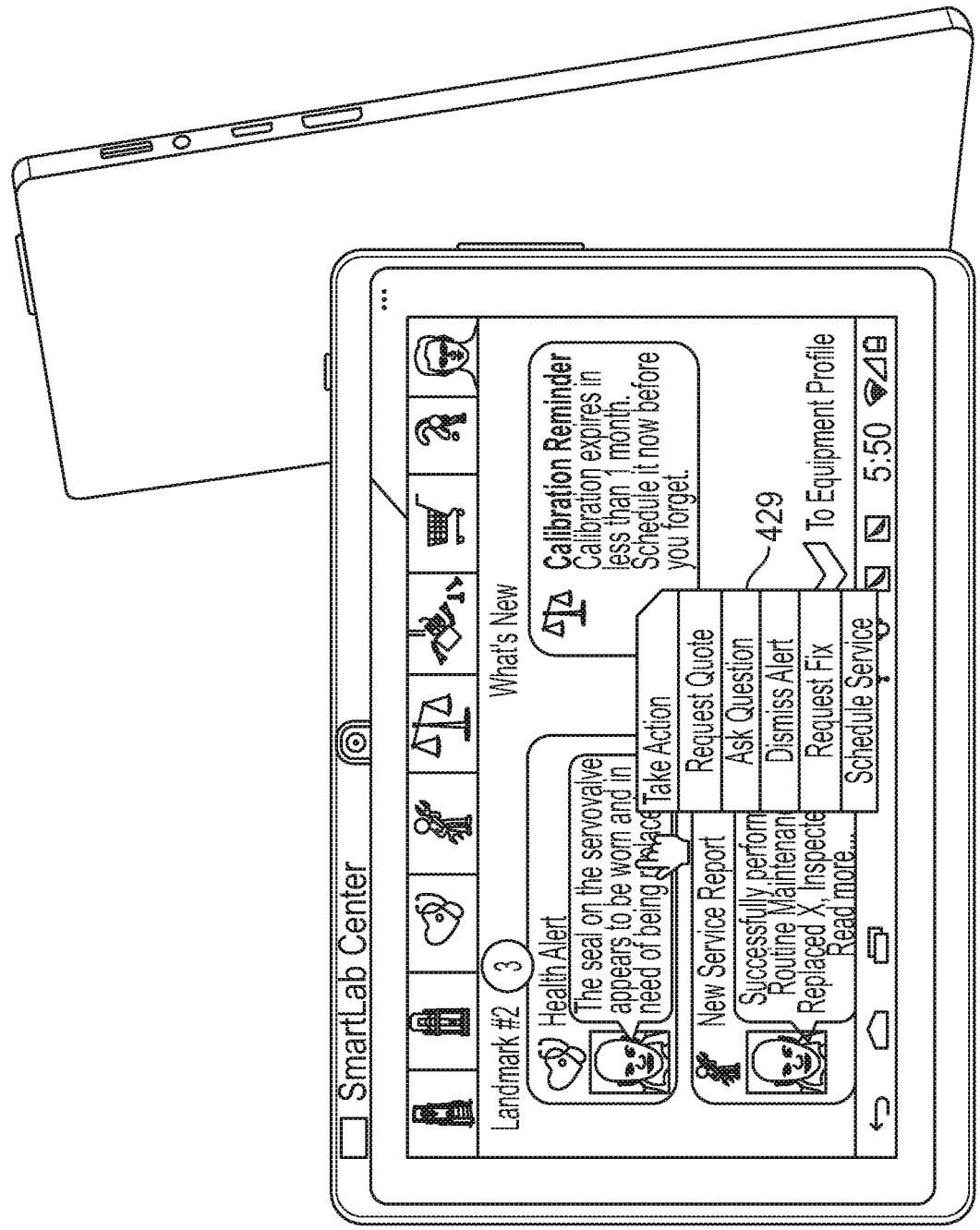

FIGS. 4C-4J show further screens according to other application embodiments of the disclosure. Some or all of the screens are available to a customer via an application that is on a customer tablet or accessible on a web interface. For example, screens, and related functions, are available as shown in interface screen 420 in FIG. 4C. Screen 420 includes selection icons 421i and 4212 for machines, health 422, service 423, maintenance 424, calibration 425, help and customer support 426. Also, screen 420 may show user alerts 427 and reminders 428. For example, health alert and service alerts 427 and calibration reminder 428 are shown on the screen 420. Further information for a particular machine is available by choosing the icon for that machine, or choosing the alerts for further information. Selection of the health alert 427 as shown in FIG. 4D brings up selection list 429 for actions that may be taken in response to the health alert.

Figure 4E:
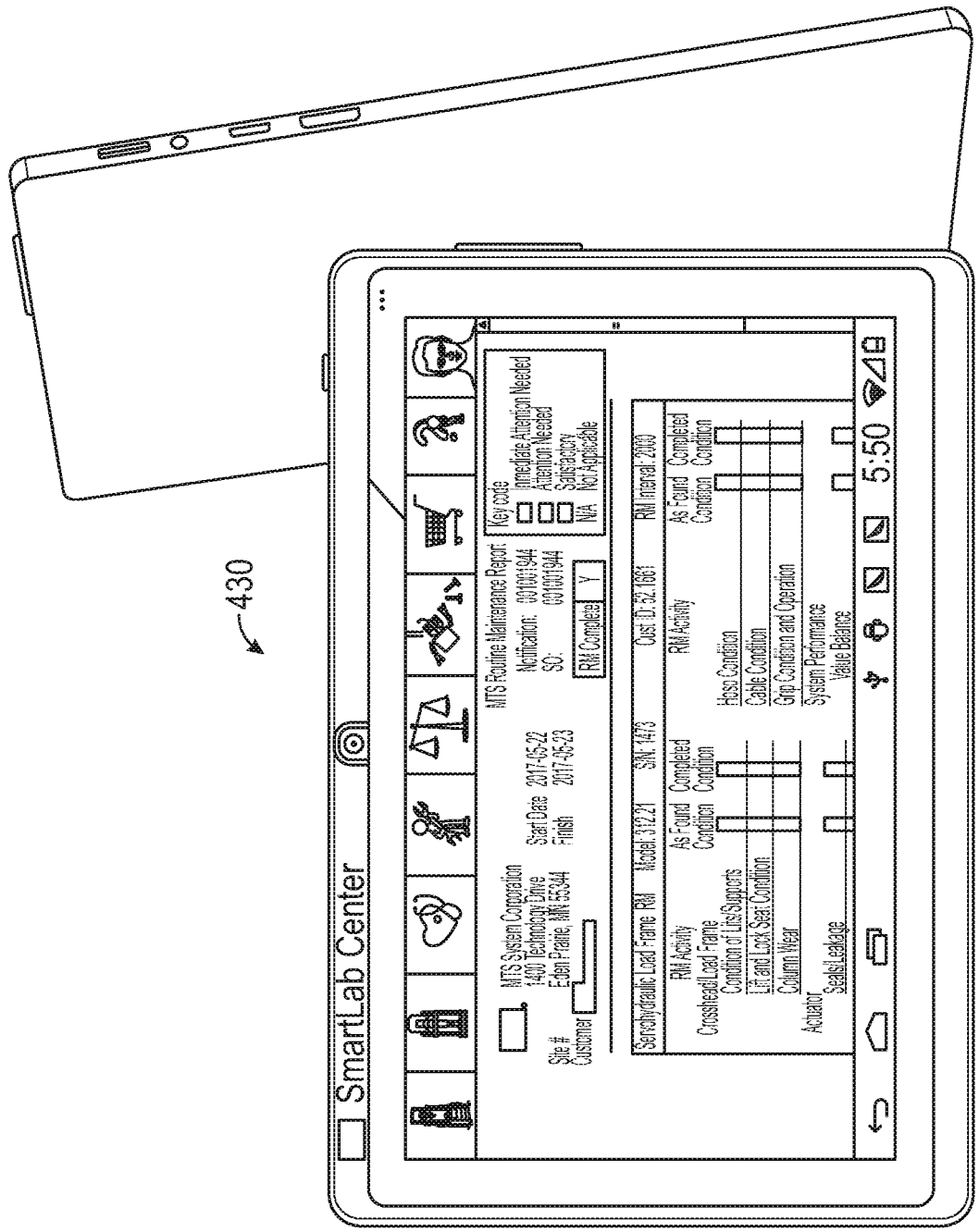
Figure 4F:
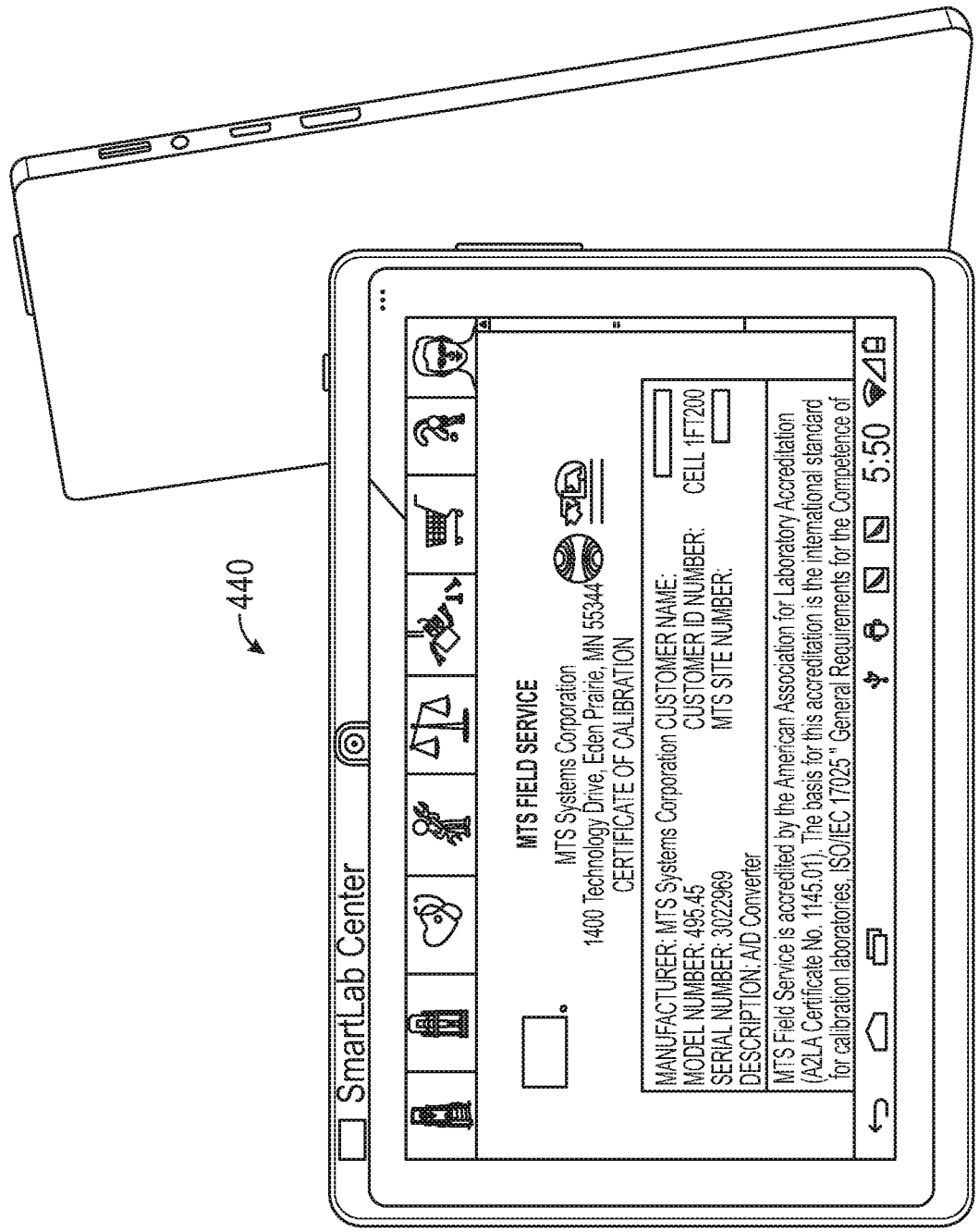
Figure 4G:
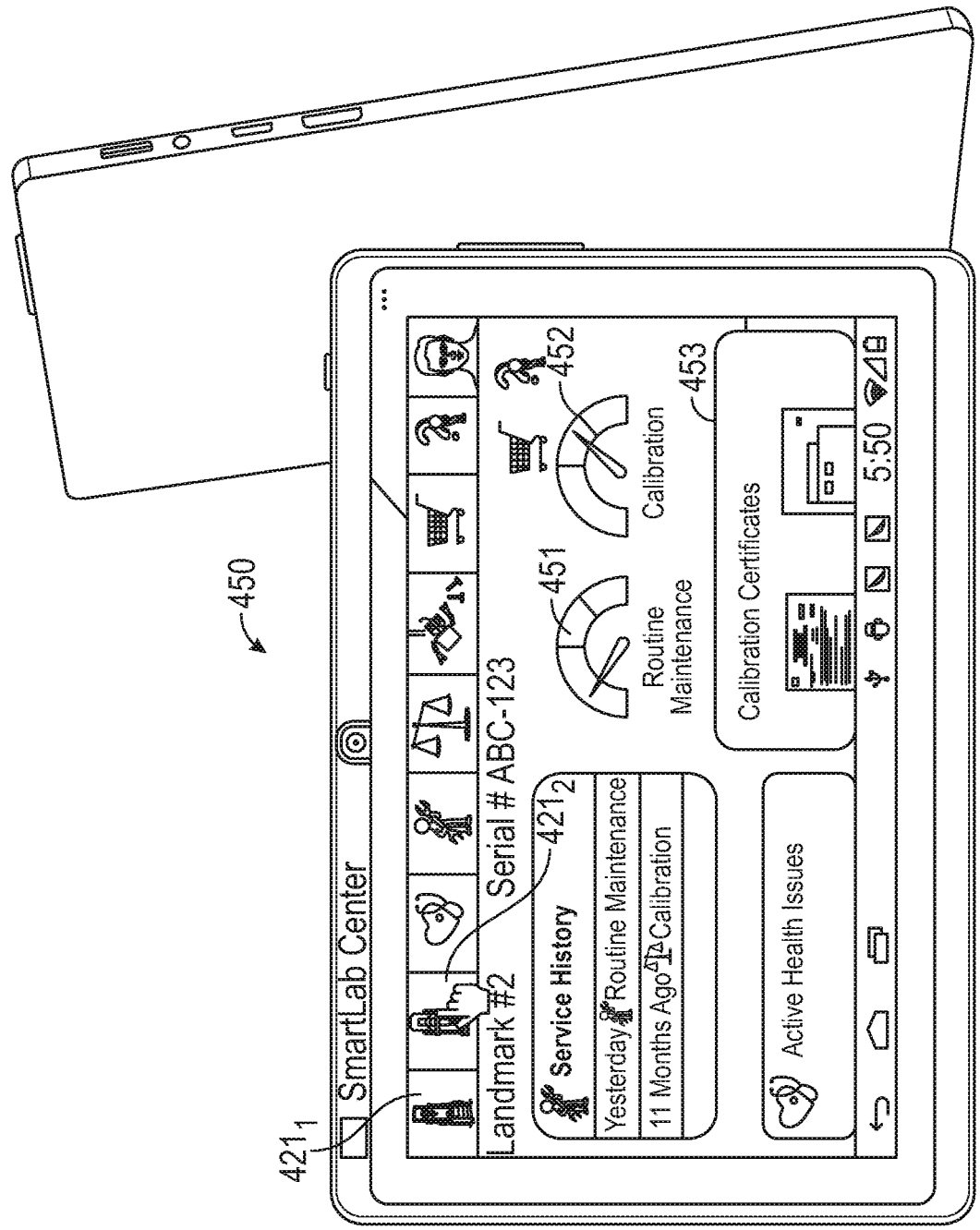

A representative maintenance report is shown at screen 430 of FIG. 4E. A representative certificate of calibration is shown at screen 440 of FIG. 4F. A graphical representation of information on machine 4212 is shown at screen 450 of FIG. 4G. Screen 450 includes graphical indicators 451 for routine maintenance and 452 for calibration. In this embodiment, a three-color alert graphic is used, with a first color, for example green, indicating no action needed, a second color, for example yellow, indicating that action may be needed soon, and a third color, for example red, indicating that action is overdue or needed now. As shown in graphic 451, no routine maintenance for machine 4212 is needed, but calibration as shown in graphic 452, may be needed soon. Calibration certificates are shown graphically at 453. Each graphic may be selected using a cursor, finger, stylus, mouse, or other pointing device to obtain or view further information for the specific machine, or for other machines by selecting a different machine icon.

Figure 4H:
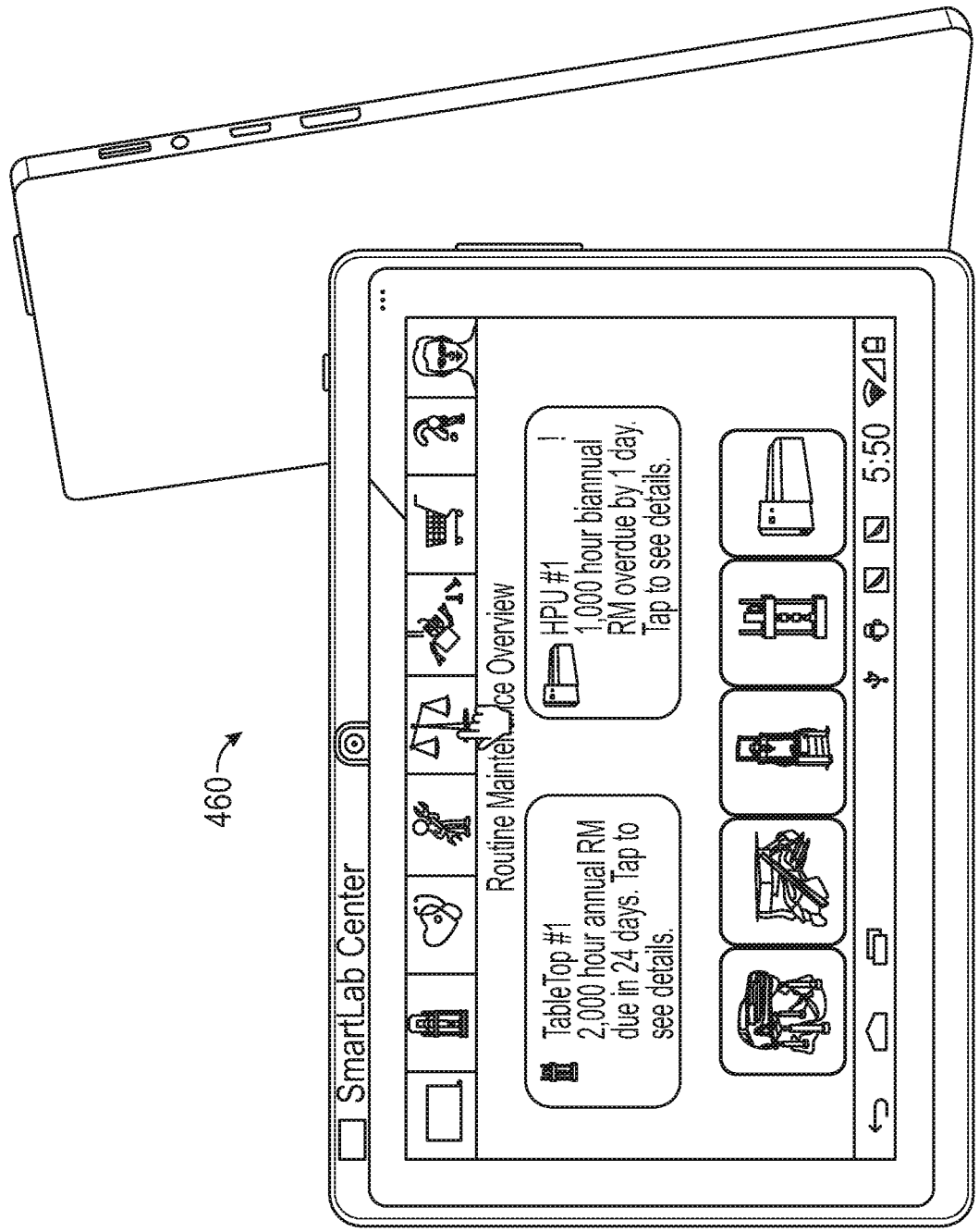
Figure 4I:
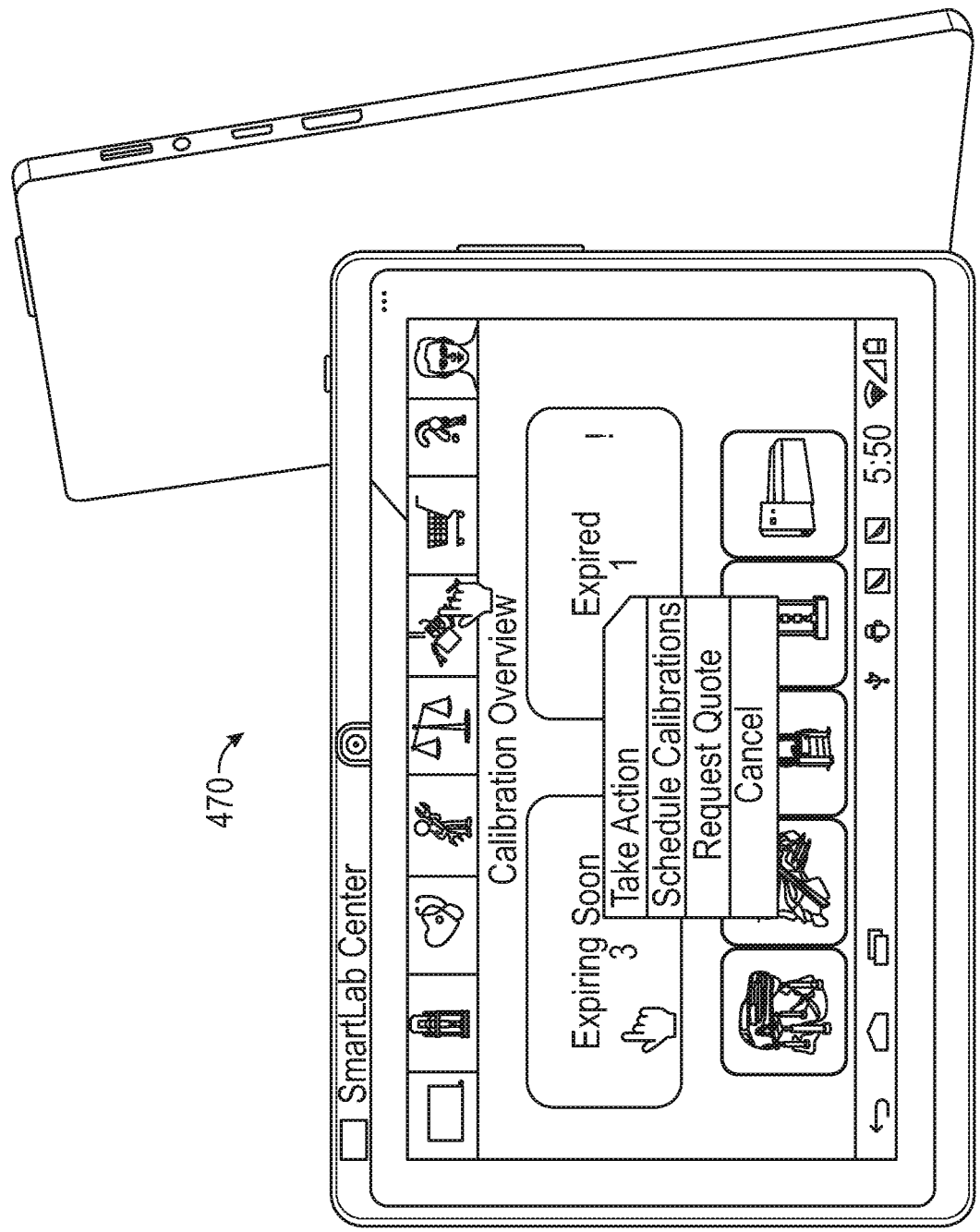
Figure 4J:
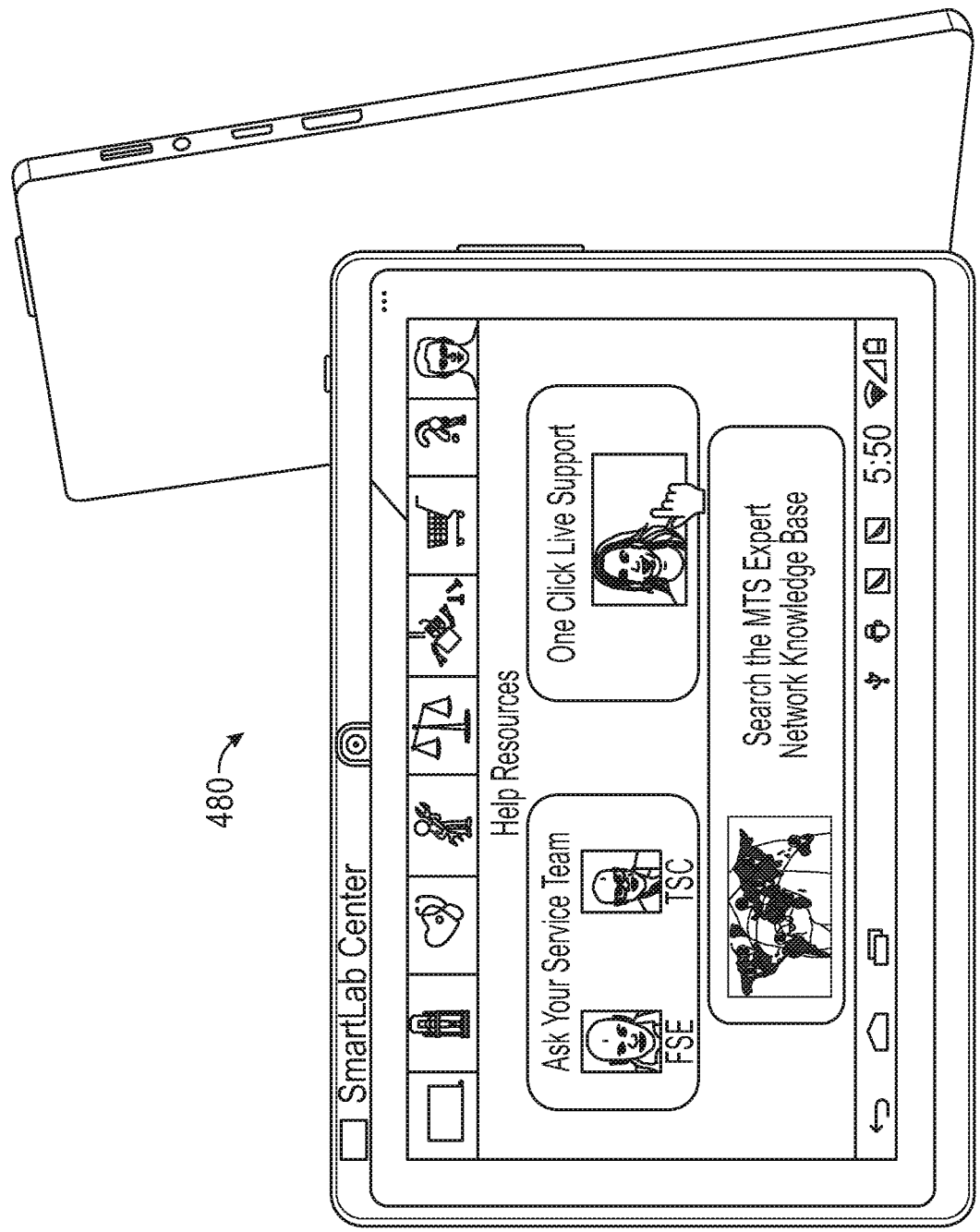

A routine maintenance overview is shown at screen 460 of FIG. 4H. Routine maintenance screen 460 is displayed after the selection of maintenance icon 424. Calibration overview screen 470 is shown in FIG. 4I. Calibration screen 470 is displayed after selection of calibration icon 425. Help and customer support screen is shown at 480 of FIG. 4J, and is displayed after selection of help and support icon 426.

Restricted Access

In one embodiment, each service tag 102 is locked to a specific account. This account may include a specific machine or set of machines, a specific laboratory, a specific site or company, and the like. It should be understood that access may be granted at an individual machine level or specific subset of machines within an account. Access may further be restricted to only specific information for a specific machine. An account in one embodiment is a virtual concept similar to a Salesforce company account or a Slack account. For example, a master customer device may be programmed for access to one specific account. That device will only store and be sent auxiliary and/or additional data for service tags 102 that are associated with the account the device is programmed to. Typically, account related devices are customer devices, although they may also be FSE devices.

If a customer device tries to scan a service tag 102 for a machine 104 that is not a machine 104 on the same account as the device, no auxiliary and/or additional data will be available on that device, and the software associated with access to machine data rejects the request. In one embodiment, data that may be sensitive, such as service records and the like, is stored as auxiliary data 202 or additional data 204 as opposed to data on a service tag 102. In this way, only devices attached to a particular account can see auxiliary and/or additional data related to that particular account, or to machines on that account.

Customers may also set up companion devices with the software, such as on their smart phone or laptop. The software in one embodiment is in the form of an application that runs on a mobile device. The companion devices of an account are in one embodiment set up and tied to a master customer device. This may be accomplished in different ways. In one embodiment, for set up of a secondary device on an account, the account master device displays a unique code. A customer or FSE adding a secondary device to the account may then enters the code into the secondary or companion device, logically tying the secondary or companion device to the master device.

A unique code such as described herein may be a string of characters, a QR code, or other image that allows the companion device to quickly pair with master device. Pairing may also be accomplished by the companion device connecting to the master device, or the other way around, by communication protocols such as those discussed herein, such as Wi-Fi Direct or Bluetooth, which may share the unique code automatically through that connection.

Once a companion or secondary device is set up to be tied to a particular account, the secondary or companion device functions similarly to the other devices on that account. It is allowed to scan tags and browse and retrieve all data for all tags tied to the account, unless further restricted by the master device.

For example, the master device can cut off access to companion devices at any time. The companion device will then not be allowed to receive any new data from the server or from other synced devices and once the companion device receives the update, all existing data will be wiped from the device as well.

While a dedicated tablet such as customer tablet 300 is described, customers may also, in another embodiment, access account information and information for machines on that account via an internet interface. In this embodiment, a customer logs in to a website portal to account access, using credentials established through the master device or companion device. The internet interface is allowed access to appropriate cached auxiliary data, additional data, and tag data to present an interface similar to the GUI for tablet devices, so that a customer may interact with the information from any web enabled device.

Individual user accounts may be set up on a master device for individual access to specific machine or tag information, as well as for the recording of individual information. User accounts allow a user to add information to an account under the context of their particular identity, as well as to consume information from the account under their identity. For example, when a specific user enters a new maintenance observation for a machine, the new maintenance observation is tied to that specific user and others can see, for example, the name and picture of the user who added the maintenance observation. New content in the system for that machine may then be shown to the user specifically, even if other users of the machine have already seen the new information.

Individual user accounts also allow a manufacturer or account master device to restrict or grant permission to data on an individual basis. For example, certain individual users may be restricted from performing certain actions, such as adding new service history items. Others may be granted permission to request new service, or the like. Another example is that certain individuals may be restricted to only viewing and interacting with a subset of equipment, for example, only equipment within a certain lab in a multi-lab account. Both Customers and manufacturers may leverage user account permissions to restrict certain capabilities to certain individuals.

Individual user accounts also grant or restrict view and edit privileges to certain data contained in the system. For example, some data may be restricted to access by a customer, whereas other data may be restricted to viewing by a FSE or manufacturer, and not the customer. Software may be used to determine based on user account permissions what data may be seen, and by whom.

In one embodiment, combined accounts are enabled. In some situations, it is desirable to allow some users access to multiple accounts. In this case, through a companion device or web access, a user is allowed to connect the user's companion device or web access to multiple accounts. The account interface then allows the user to both switch between accounts as well as combine information from both accounts into one screen.

Combined account access may be achieved through different methods. In one embodiment, an application on a companion device can maintain connections to multiple accounts, and combine information from the multiple accounts on the specific companion device. In another embodiment, multiple accounts are logically tied to a parent account natively in the system. This is most commonly used for an organization that may have many accounts but also wants to have a parent account, or multiple levels of accounts, for persons of different levels within the organization to monitor activity across more than one of its accounts. In this situation, a user need only be added to one account, the parent account, and then will have access to multiple accounts by virtue of those accounts being children accounts to the parent account.

Auxiliary and/or additional data may also exist that is tied not to a specific device, but to an account. This data may enhance the value of the data on each tag. For example, account-level auxiliary data may be used to show relationships between multiple tags to give information of one tag in a larger context, such as a laboratory, site, or other location, such as how the machine or machines associated with a tag or tags relate to other machines.

Auxiliary and/or additional data at the account level is synchronized in one embodiment between devices and servers in a manner similar to how tag auxiliary and/or additional data is synchronized. All devices associated with a particular account are allowed to synchronize this data.

Auxiliary and/or additional data may also be used to record additional information, such as but not limited to what kind of service contract a customer has with the manufacturer or manufacturers. Based on this information, a customer experience may be tailored. Account balances may be shown in the interface. Call-to-action buttons may be tailored accordingly based on this information. For example, if a customer has a special type of contract with a manufacturer, and the customer is viewing a health issue on a specific machine, the interface may ask the customer if the customer wants to request a visit from a FSE to fix the issue. If so, a FSE may in one embodiment be directly notified, as the data on the machine, tag, and account allows the application to know what services the customer is entitled to. No special quote or purchase order is needed.

Figure 5:
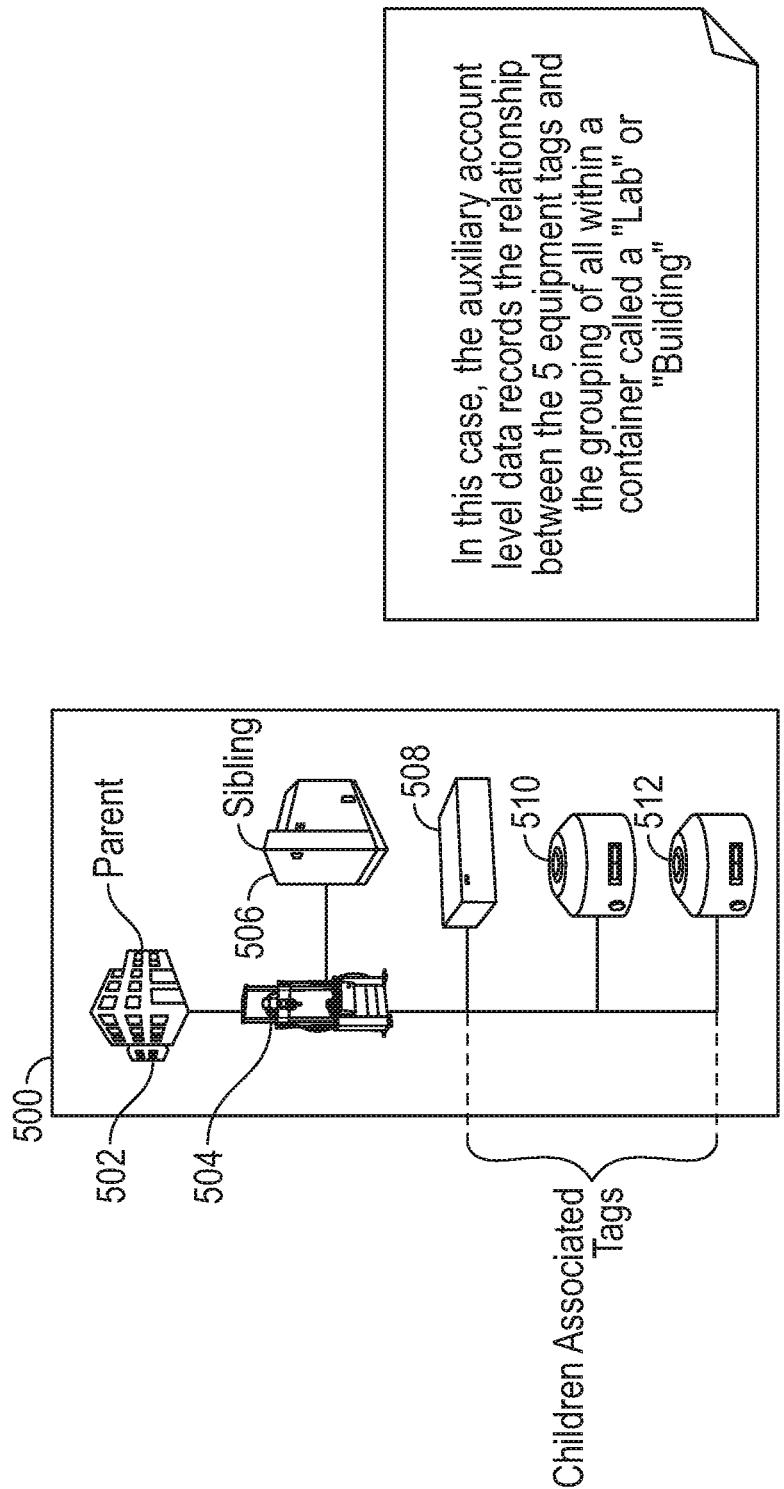
FIG. 5 illustrates an embodiment showing use of data not tied to a specific tag or machine.

FIG. 5 illustrates an example of the use of data not tied to a specific tag, and the use of that data to make associations among various machines. An organization 500 is shown. Organization 500 has a first building 502 which houses a number of machines 504, 506, 508, 510, and 512. Under the building 502, a specific machine 504 has a tag that, using data not tied to that specific machine, but instead account data relating to the organization 500, indicates the machine 504 relations to other machines, in this instance within the building 502. In this example, machine 506 is identified as a sibling machine to machine 504, and machines 508, 510, and 512 are identified as child machines to machine 504. An organization 500 may have multiple buildings such as building 502, with each building having its own set of relationships. Relationships need not be based on buildings or on a physical location, but may also include relations between all machines of a certain type across the entire organization 500. The types and nature of the associations may be varied to allow any grouping of machines within an organization 500 without departing from the scope of the disclosure.

Further detail of health alerts is provided below. In one embodiment, when a FSE performs any kind of work on a specific machine or surrounding machines, the FSE will commonly run across maintenance issues with one or more machines. For example, a FSE may notice that a crack is forming in a part, or oil is starting to leak, or that a part is very old and likely to fail soon, or any number of other kinds of observations. These observations are entered into the data for that machine or account as health alerts. Typically, a FSE will provide a verbal report to a customer, or will place a comment in a Service report regarding the machine health issue. If the FSE mentions an issue to a customer, that information may be quickly forgotten by both the FSE and the customer. Further, if the health alert information is simply placed in a routine report, it can also be easily missed and forgotten.

To increase the likelihood that a health alert is seen, remembered, and/or considered, embodiments of the present disclosure place the health alert into service tag information for the specific machine. With synchronization of service tag data as has been described herein, instead of simply a verbal or written report, health alerts are associated with a specific machine, and service tag data for that machine is updated. In this manner, whenever the service tag for a machine is scanned, health alerts and other maintenance issues for that machine are presented to the user or FSE upon scanning.

FSEs and users may add a new health alert, which is then attached to the record for a specific machine. This way, it is now logged and will not be lost. Any user or FSE who scans the service tag of a machine with a health alert tag will see the outstanding health issue and its status (e.g., is it still unfixed, have there been additional discussion surrounding it, has it been fixed and resolved?). Furthermore, the interface screens of the application or web interface allow a user to quickly scan all the equipment associated with a specific account, to quickly see all outstanding health issues across the division of the account, be it an entire organization, a specific lab, building, machine, or the like.

The saved health alerts allow for quick and efficient customer or FSE tracking of information across multiple machines. In one embodiment, health issues are interactive so that a user can easily take action on a health issue by selecting an action from a dropdown list 429 (FIG. 4D) like "Request Fix" or "Schedule Service" to notify the manufacturer that the customer would like to have a health issue resolved. When such an action is taken by a customer, the manufacturer is notified about the request, with a direct link back to the health alert. When the manufacturer performs service to fix the issue, the repair is then linked to that original health alert, and the health alert is resolved.

Health alerts may originate from multiple sources. For example, FSEs may enter a health alert as they make observations. FSEs may also perform specific assessments aimed at discovering issues, much like a car mechanic may check for wear and tear on a car. Automated determination of health alerts is also used in one embodiment. Customers or other users may also record health alert observations.

In one embodiment, automated technology is used to monitor a machine or plurality of machines for health issues. An example of such a technology is the Echo Health Monitoring product family by MTS of Eden Prairie, Minn. In one embodiment, such automated technology is used with the service tags 102, machines 104, and tablets such as tablet 300 or tablet 108 and remote storage 112 as another source for interactive health alerts. When automated technology identifies a problem with a machine, such as the oil contamination sensor identifies a spike in contamination, the automated technology sends a new health alert indicating the issue that was detected and any pertinent data. This is added as a health alert to the particular machine information and data, like an alert that would be added by a FSE or customer. The networked nature of the embodiments of the present disclosure allow for the combination of all health alerts, no matter the source, in one interface for a user to easily track all machines in a location such as a building, laboratory, or the like, from a health perspective.

Automated health alerts may also be generated from the machines themselves. A machine may have at least some self-detection hardware and/or software. When a machine detects a health issue, the machine can also record this information to its service tag, and the next scan thereof will alert a user of FSE of the health issue.

When an issue has been detected with a machine, be it a health issue, calibration issue, maintenance issue, or the like, alerts and/or reminders may be generated, as discussed, by the machine itself, by a customer, by a FSE, or the like. There are many instances in which it may be useful to notify a user of such issues, including when new content is available or the status of equipment has changed, such as when a new maintenance issue has been logged for some equipment. In such situations, users may be alerted to issues using one or more of multiple methods.

For example, a local machine may display a notification or play a sound to get a user's attention, driven from when it receives knowledge of the new content or whatever has driven the notification. The alert or notification may be pushed to a user tablet, or to a remote storage 112 as has been described elsewhere herein. Further, if an issue arises, for example, a known issue with a particular machine or type of machine, the receipt or entry of such information at a central database, such as that stored on remote storage 112 or the like, may be pushed out to appropriate recipients, such as by new email, text message, or push notification to users based on user's contact information and alert settings.

The machine data and information stored on a service tag, and/or auxiliary data on a user or FSE tablet, and/or additional data stored on a remote storage, may also be used to drive service notifications and reminders for machines. For example, information about an active calibration certificate's expiration date is stored with the machine information. This information may be used by the machine, or by a database/server stored elsewhere, such as in the cloud or at a remote storage, to notify the user through user interface notifications or any alert method described herein to notify or alert the user that a new calibration is due and the existing one is expiring.

Embodiments of the present disclosure may also be used to improve and make more time efficient the ordering of replacement parts in addition to service. When a machine has a maintenance issue, such as a part that is failing or has failed, self-diagnosis by the machine itself may be able to identify the exact failed or failing part. Further, as parts are sometimes superseded by parts having a different part number, or compatible parts are available, a user may not be able to determine quickly what replacement parts are proper or available.

Using embodiments of the present disclosure, instead of having to have a detailed conversation with technical or customer support, including the determination of the exact machine model number, serial number, maintenance history, and the like, a user can scan a service tag 102 associated with a machine 104 having maintenance issues, and all the data available for that machine 104 is retrieved using a combination of tag data, auxiliary data, and additional data as described herein.

As the data stored on the service tag 102, and any auxiliary and/or additional information from tablets and remote storage, provide a full accounting of the machine, including serial number, model number, and the like, if a customer wants to order some compatible part for a machine 104, the customer can scan the service tag 102 for the machine 104, and the interface displays automatically a list of exact parts that are compatible with the machine, and provides a link for ordering parts.

Alternatively, the user can use an order button to link to an online store and can browse the part store from a high level to view compatible parts, or parts in a certain area, as an example. When reviewing load cells, for example, a customer may tap a machine service tag 102 while on the load cell screen filter down the current view to only those load cells that are compatible with the service tag 102 that has been tapped.

Remote Support is initiated in one embodiment by a user selecting the icon 426 for help and support. With this remote support, a particular machine 104 is known by the reading of information from its associated service tag 102, so that upon connection with support, the request may be routed, prior to the customer actually speaking with support personnel, to an appropriate service technician, such as, for example, a technician or support person who is qualified to assist the customer with the exact machine 104 that is selected. Traditionally, in order for a support person to help a customer, the support person needs to know exactly what machine the customer is calling about. As serial numbers, model numbers, and the like may be confusing or difficult to find, or if the customer is not in the lab at the time, the ability to load machine specific information either at the machine by accessing its service tag 102, or by accessing the machine through the customer tablet or web interface, speeds and eases the process of getting quickly and correctly to proper customer service.

With embodiments of the present disclosure, a customer may initiate a support call from the customer tablet 300. This may be done after scanning a service tag 102 for a particular machine 104, or by looking up a particular machine on the customer tablet 300 or web interface, as has been described elsewhere herein. The application or web interface receives the information regarding the exact machine on which the customer is contacting support, and the support person is able to see right away, and without a lengthy process to determine it, all of the identifying details about the machine such as model # and serial #, as well as any additional or auxiliary information, including health alerts, maintenance status, calibration status, and the like. The customer no longer needs to know this information and does not need to spend time finding it or conveying it to the support person.

In another method, a customer can initiate a support call from a customer tablet 300 or web interface even when the customer is not in front of the equipment. This may be done, for example, by accessing a cached version of machine data, or by accessing a database containing the machine and service tag information. This is all available in one embodiment from either a customer tablet 300 or via a web interface. In another embodiment, a customer may initiate a support request through other mechanisms. For example, the support person can ask what equipment name the customer has given the equipment they are calling about. For example, the customer could say: "I call it Loadframe 5". The support person is able to retrieve information regarding the machine, including by name, as well as by service tag 102 information. The customer support person can look up the customer name of "Loadframe 5" to find all the associated identifying data like model # and serial #. In all cases, significant time has been saved to streamline providing support to the customer.

Service requests and ordering is also streamlined by embodiments of the present disclosure. Without the embodiments described herein, if a customer wants to order a service, such as calibration, for several systems in their lab, this can be a time consuming process. The manufacturer will want to know what specific machines the customer wants to have calibrated, because, for example, different machines will take significantly more time and require different tools and skills than other systems. Once again, this will take significant time on the part of the customer and manufacturer to figure out exactly what each system is that they want calibrated.

With the embodiments of the present disclosure, a customer can request service directly from the user interface on the customer tablet 300 or web interface. The customer can scan the service tag 102 for each system 104 that they want calibrated, as an example. A calibration request may be sent digitally to the manufacturer through the application or web interface, and the manufacturer receives the calibration request with all of the machine details attached, since all of the identifying information is known from the service tag 102 for the machine/system 104. The manufacture is then able to quote or dispatch service immediately without needing to spend time determining the exact details of the request or the machine first.

In another mode of operation, a customer taps on the tablet into "Service Request mode" and then selects the type of service (such as Calibration, or ordering parts). Then, the UI asks the user to tap every system that they want Serviced. The user can walk around the lab tapping each system that they want calibrated (or by using UI), and then a service request is sent with the full details about what systems have service requested.

Figure 6A:
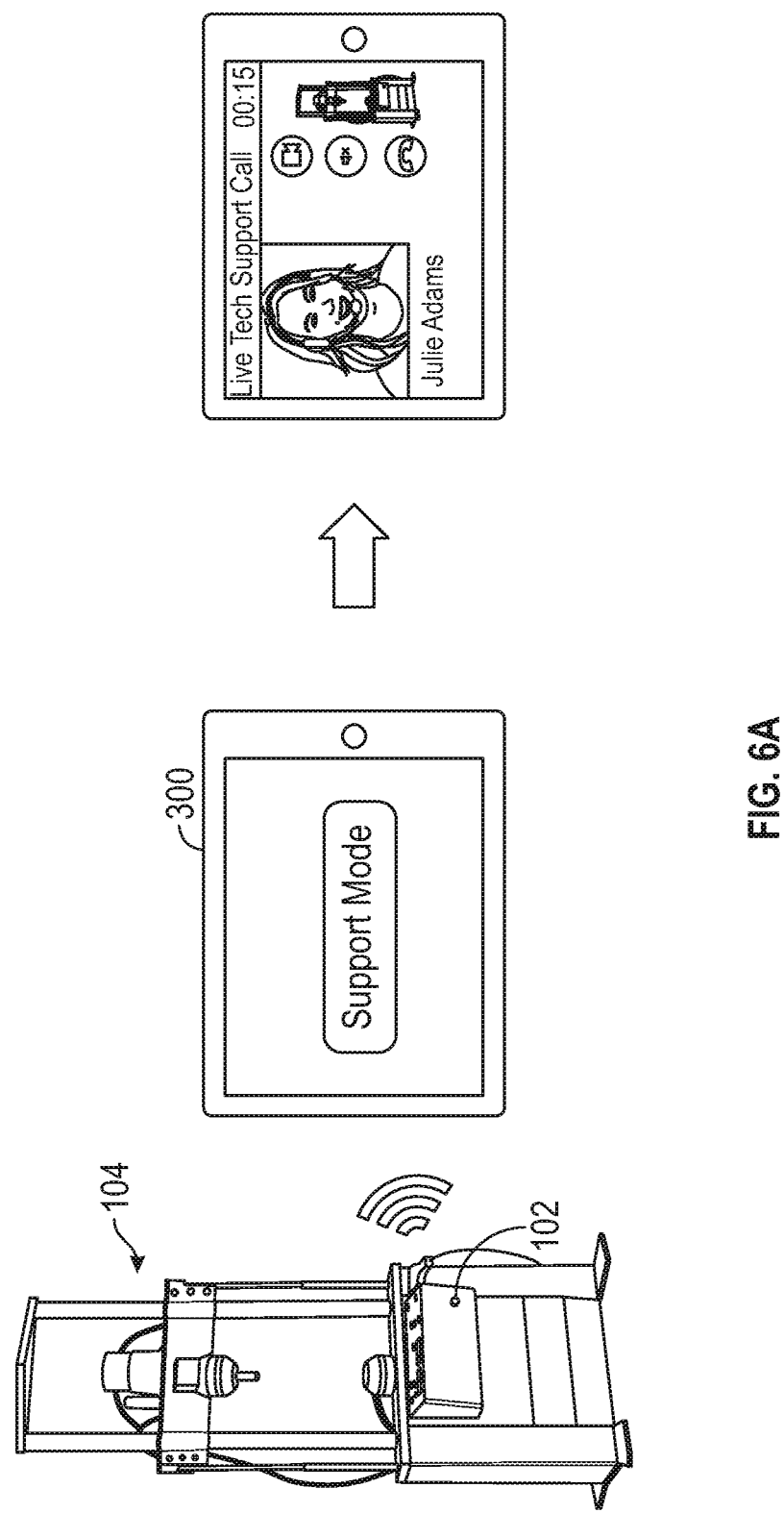
FIGS. 6A-6B illustrate a method embodiment for direct system access to customer service via a customer tablet.
Figure 6B:
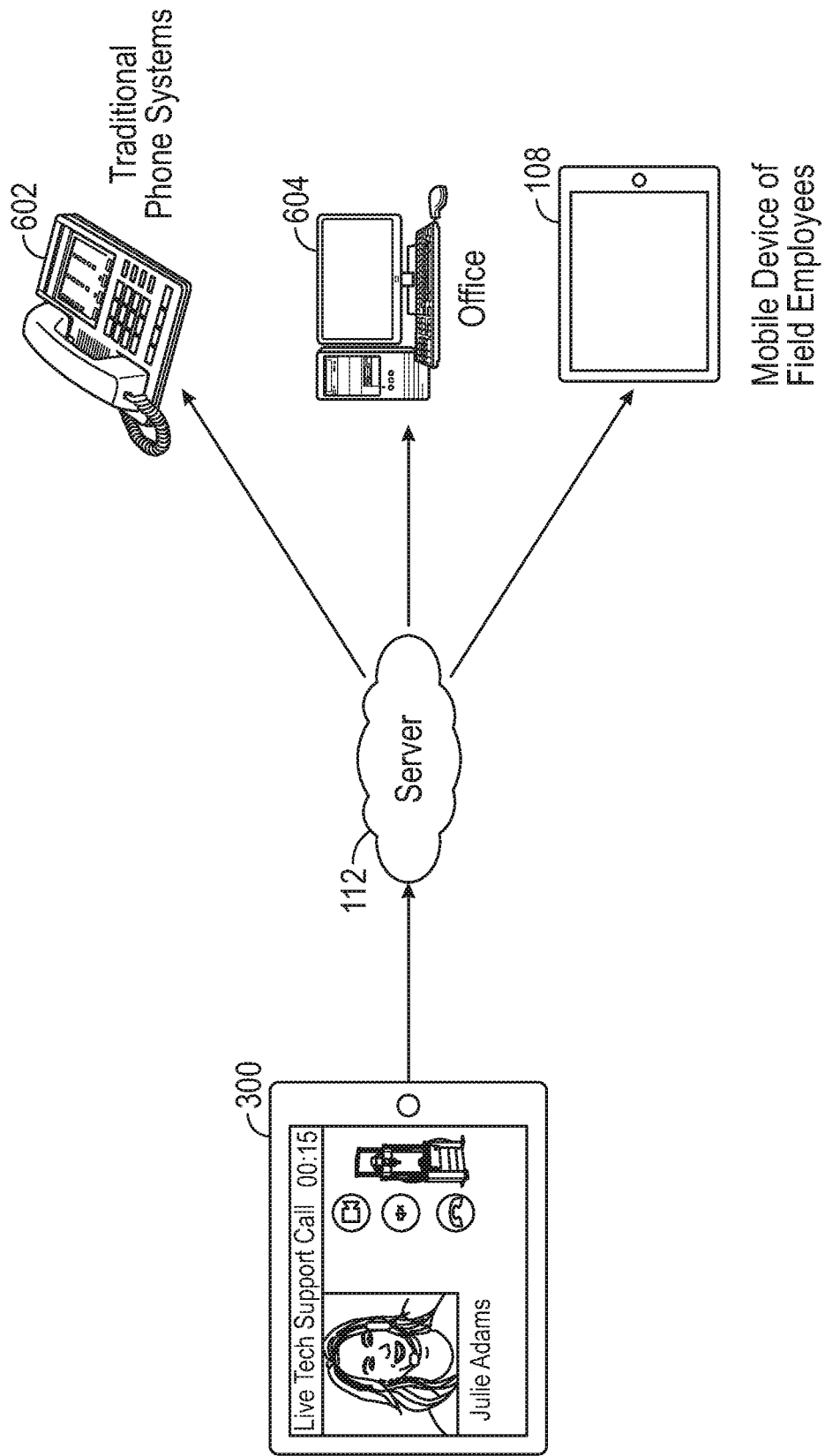

FIGS. 6A-6B show representative direct system access to customer service via a customer tablet 300. Clicking the support icon 426 on a screen of the application initiates a one tap support option. Once in the support screen, a service tag 102 for a machine 104 may be scanned to initiate a support session for that machine 104. The customer device 300 knows what user is logged in, it knows where the machine is located, and after tapping the tag, the device 300 knows exactly what the machine 104 is. The device 300 can then initiate a support session specific to that machine 104 that has been identified through the scan of its service tag 102. Based on the user's preference for audio call, video call, audio with optional video, or chat, the device 300 chooses in one embodiment what type of support method to use and initiates a session using that method. Embodiments of the present disclosure also allow for the changing of the type of communication during the support session, such as, for example, to allow video of the machine or problem, chat, or the like.

The device 300 uses available information about the machine, account, knowledge and availability of support personnel, to determine who best to initiate the support session with. For example, questions about certain equipment types are best suited to be answered by certain people. In this situation, the manufacturer support system routes the support session to those individuals. In other situations, certain individuals who deal with that customer frequently are best suited to answer their questions as they are most familiar with the specifics of that customer and thus the manufacturer support system will attempt to connect the customer with them. The system can also take into account the availability of support individuals in order to route the support session to an individual who is able to immediately help the customer out.

Ultimately, the manufacturer support system is able to use retrieved information on the machine and customer, and information known to the manufacturer support system to automatically route the support session to one or multiple individuals without needing to go through manual or partially-automated triage steps that frequently occur when trying to initiate support (e.g., having to explain what you are calling about and where you are calling from to an operator who will then route the call accordingly, or making the customer select options in an "automated" phone tree to route their support question to the right person). The support system already has the answers to typical triage questions, since the service tag 102 and machine 104 information is known to the system at the initiation of the contact.

FIG. 6B illustrates options for the connection of the support session. The support session is routed through a server which may be a remote storage 112, or manufacturer specific server, from the customer device 300 to one or multiple support individuals on a variety of platforms, such as to a mobile field device 108 of an FSE, to a phone support person 602, to a remote support person on a computer 604, or the like. Through an application on the mobile devices 108 of support individuals, the support person can be connected to the customer via audio, video, and/or chat. Individuals on desktop computers in office environments 604 can also be contacted. And finally, the support session can also be routed into and over traditional communication systems 602 such as a desk phone.

Multiple individuals can be pinged and included in the support session in one embodiment. One or multiple individuals can join the session depending on availability and need for extra support. Individuals joining the support call are immediately presented with all relevant information to aide in the employee assisting the customer.

Common information provided to all parties in the support group includes by way of example the exact equipment the customer is requesting support on, who is requesting support, what account and location, and the history surrounding that equipment and account. The support person does not need to ask the customer for this information. As the identity of the customer is known, by the account information provided to support personnel, the support person can initiate their greeting not as "Hello, who is calling and what are you calling about?", but instead, can address the customer by name and machine: "Hello Andrew, I see you are calling about your Landmark Load Frame, how can I help you today?"

While clicking on the support icon 426 is one way to initiate a support session, support may be initiated through multiple methods. As has been mentioned, when a customer is on the support section of the customer device application, tapping a service tag 102 for a machine 104 initiates a support session for that machine. When a customer is already viewing machine details on a customer device 300, tapping a "One-Tap Support" button also initiates a support session for that machine. This allows a customer to initiate one-tap support even when they are not physically in front of the equipment.

Figure 6C:
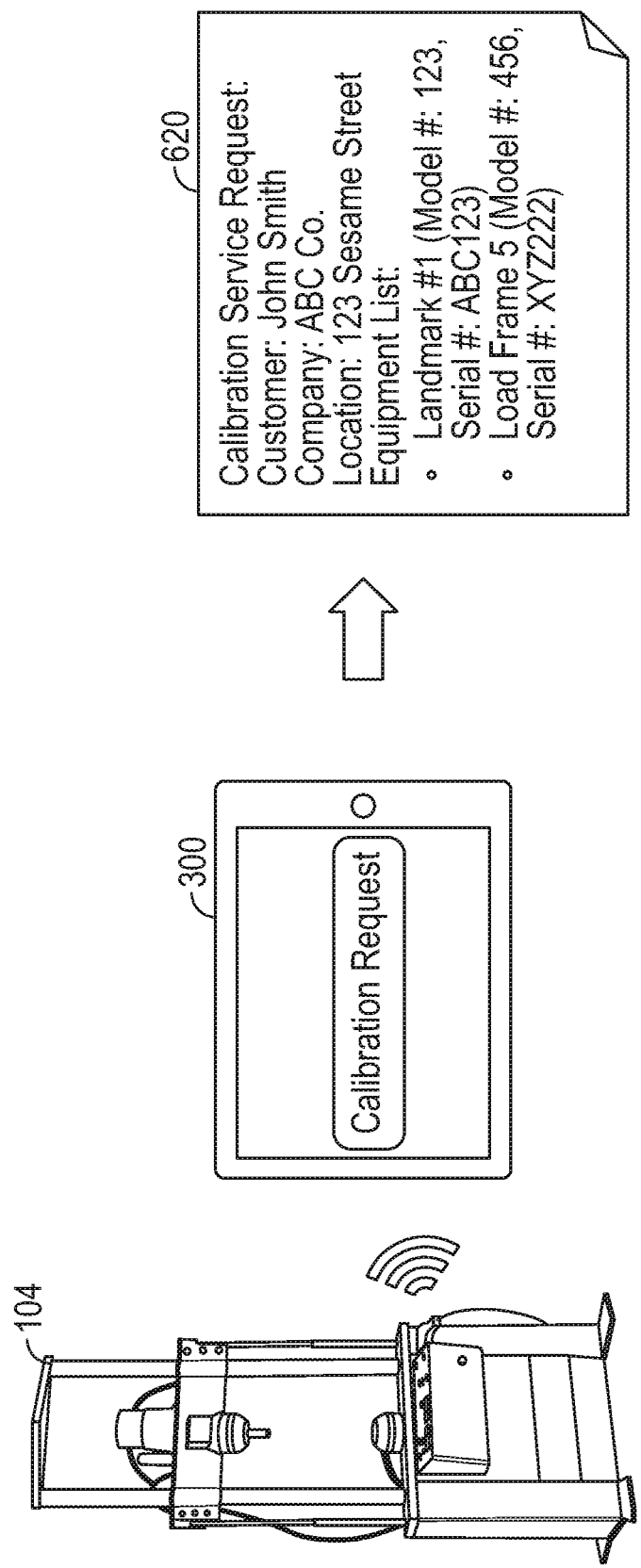
FIG. 6C illustrates a method embodiment for a service request for a machine.

FIG. 6C illustrates streamlining of a service request for a machine 104. Similar to a support request, to initiate a service request, a user may choose one of multiple methods for the initiation, and one of multiple services. In one embodiment, a user selects service icon 423 on a screen such as screen 420. Service types are shown, such as calibration request, routine maintenance, repair, or other common services. To initiate calibration, for example a calibration request is initiated using the calibration icon 424 in one embodiment. Once that is selected, the user taps one or multiple equipment service tags 102 to initiate a calibration request for that equipment. The customer device 300 knows what user is logged in, it knows where the equipment is located, and after tapping the tag, the device knows exactly what the equipment is. The device can then initiate a service request back to the manufacturer with all of the necessary details 620 on what service is needed and on what equipment.

There are other methods that a customer can tap for service. After tapping/scanning a service tag 102 and viewing the equipment 104 information, the user can tap the "Request Calibration" button to immediately request calibration service on that system. When viewing the equipment information remotely, the user can tap on the One-Tap button as described above. When presented with a notification that calibration is due, a user can act on the notification by tapping a button to request service now for the service described in the notification.

On a summary type page, like the Calibration Summary, Routine Maintenance Summary, or Repairs Summary Page, the user can tap the appropriate button shown next to each system in the account to quickly request service for any number of equipment one after the other, each through One-Tap.

Figure 7A:
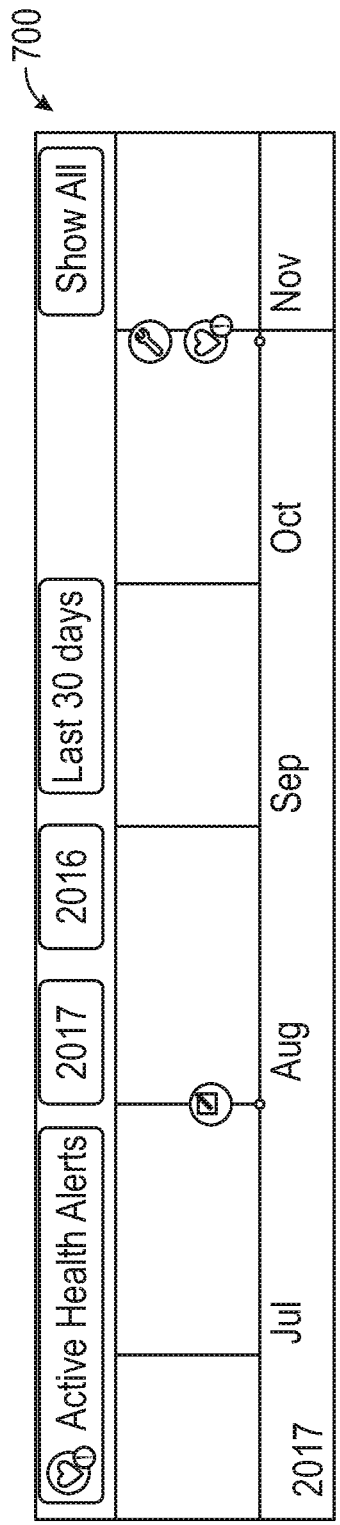
FIGS. 7A-7C illustrate embodiments showing equipment timelines and access thereto.
Figure 7B:
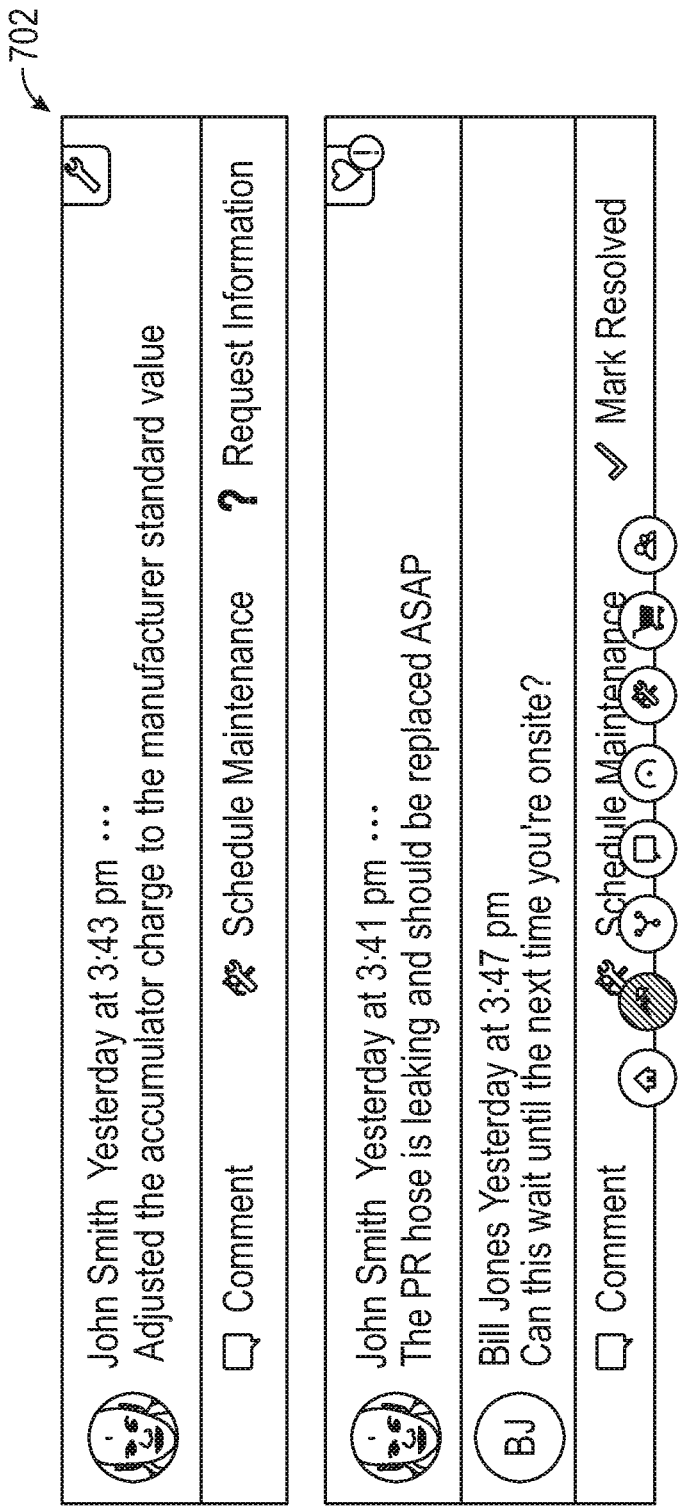

FIGS. 7A-7B are directed toward embodiments showing equipment timelines. In one embodiment the user interface on the web interface, or on the application on a customer device 300, allows a user to view and explore the service history of their equipment. This information is stored on the tag and/or auxiliary data and additional data as described herein, and is displayed through the software. An interactive timeline 700 as shown in FIG. 7A allows a user to see important events over time. An icon indicates an event category type. The timeline 700 is scrollable, zoomable, and filterable. A user can easily jump back to past years to find historic events for the particular machine 104. The timeline scope may also be changed. Changing the scope of the timeline automatically adjusts the event list below the timeline. Tapping on a timeline item jumps the event list to the selected item 702 as is shown in FIG. 7B. Timeline events are used in one embodiment to record details about maintenance events, health notifications, repairs, calibrations, usage notes, observation notes, and other types of relevant information associated with the equipment. Each event captures text information about the event, the person or generator of the event, relevant photos, videos, documents, or other type of attached media, any resulting discussion surrounding the event, any relevant state of the event, applicable action items, and the like.

Equipment Timeline—Action Items

A feature of one embodiment of event items is the ability for a user to initiate and drive actions off of an event. For example, a health alert event type records the discovery of a health issue on equipment. In addition to recording the discovery of this issue and communicating its existence, the event allows the user to take action based on the event. For a health issue, the action may be to "Schedule Maintenance" or "Request A Fix". These actions are variable depending on the event, user, and account details. The user can tap an appropriate button on the GUI, such as the "Schedule Maintenance" button, to initiate service in order to resolve the health issue. The user may then be prompted to choose when they wish for this fix to happen and workflow can be initiated behind the scenes.

Figure 7C:
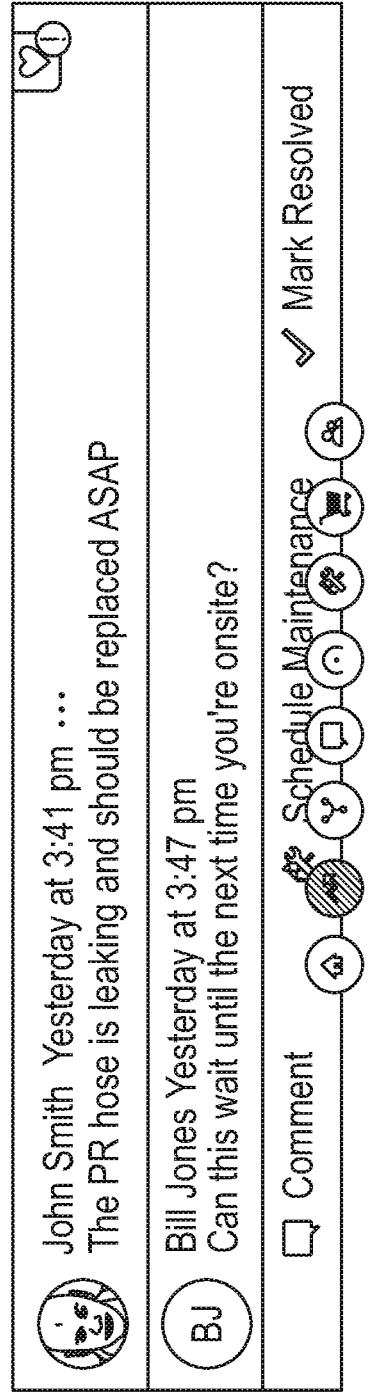

As shown in FIG. 7C, conversations may be tied in the information to physical equipment events such as conversations about the serviceability of equipment, and the like. Another feature of events is that they allow conversations to occur surrounding the specific event. This allows users to efficiently discuss various events to learn more, take more informed action, clarify, etc. For example, if a FSE adds a new health event about a hose that is leaking, as is shown in FIGS. 7B-7C, the customer can add a comment on this event to ask a clarifying question, such as "Can this wait until the next time you're onsite?". The FSE is then notified of this new comment and can respond back to the customer. This conversation is integrated with the experience so the conversation and answers determined are automatically stored with the rest of the equipment history to further enhance the value and clarity of the information. This information is retrievable by customers, FSEs, and support personnel after the synchronizing of data as discussed elsewhere herein.

Figure 8:
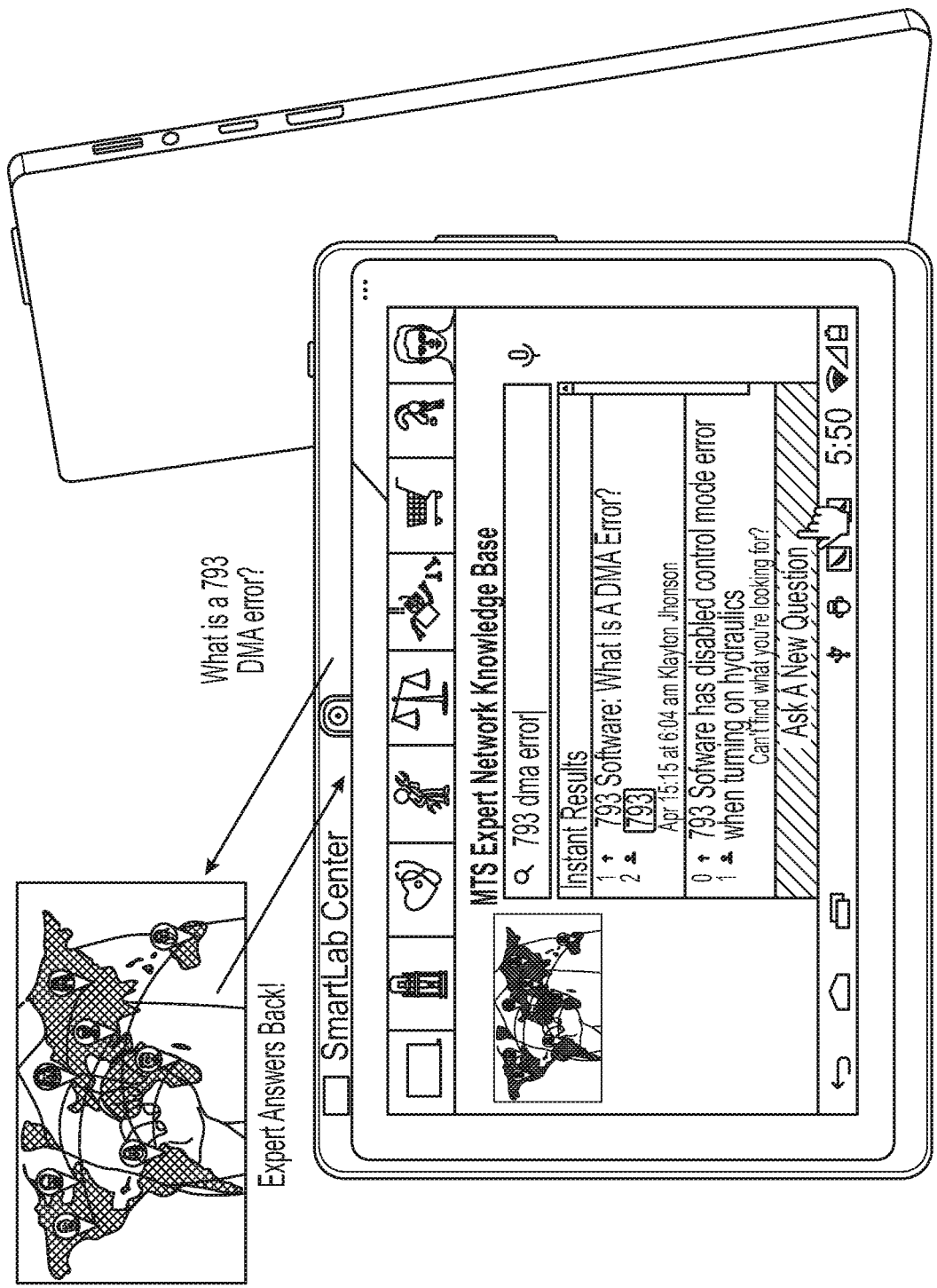
FIG. 8 illustrates a representative graphical user interface screen for customer service access according to another embodiment.

Embodiments of the present disclosure also allow customer access, via the customer tablet 300 or web interface, to a customer knowledge base, as shown in FIG. 8. One of the support features integrated into the embodiments of the present disclosure is the ability for users to search a knowledge base for answers and ask new questions when existing answers are not found to solve their question. A customer can enter a question or keywords into a search field from the help and support button 426, or from help buttons on other screens of the GUI. Previous questions and answers may be searched to see if any of them are relevant to the question entered. The user can tap into any answers that seem relevant to see if they indeed do solve their question. If a previous questions solves the problem or is helpful, it can be upvoted to indicate usefulness.

If no useful answer was found, the user can "Ask A New Question". To do this, the user is prompted to enter a new question with relevant details. The question is then routed to a variety of expert employees at the manufacturer. If the question is related to a specific machine 104 that has been identified by scanning or identifying its service tag 102, the customer support system is able to understand key words in the question and information about the user and equipment to route it to a person or multiple people who are best equipped to answer the question. For example, a question about TestSuite software will be sent to people who are TestSuite experts. Answers are then provided by manufacturer employees and these are immediately visible to the user who asked the question. The user can indicate that one of the answers solved their problem.

At this point, a manufacturer employee can then decide if they should make this question and answer available to other customers. If so, it is published so that other customers who have a similar question can benefit from it and find it in the search. Any sensitive or personal identifying information is removed before it is published broadly. Existing knowledge articles and content can also be linked to the Q&A system so that they can be pulled in during a search.

Embodiments of the present disclosure are easily extended to support in multiple languages, selectable by account, by user, or at the time of initiation of a service or support call. In one embodiment, user content is translated into whatever language the user wishes to view the content as. The user can toggle between languages by shaking the device or using a GUI toggle to switch between their native language and the original language which can be useful for ensuring nothing was lost in translation. This approach allows a FSE to enter data in one language and a customer to view it in another language.

Since online translation services are commonly used for this approach, translations can occur in real-time if a connection to that service exists. Otherwise, local translation engines can be used or the online translation can be cached and transmitted with the content exactly as auxiliary data is transmitted as described earlier in this document.

Offline Devices Code Updates

Figure 9:
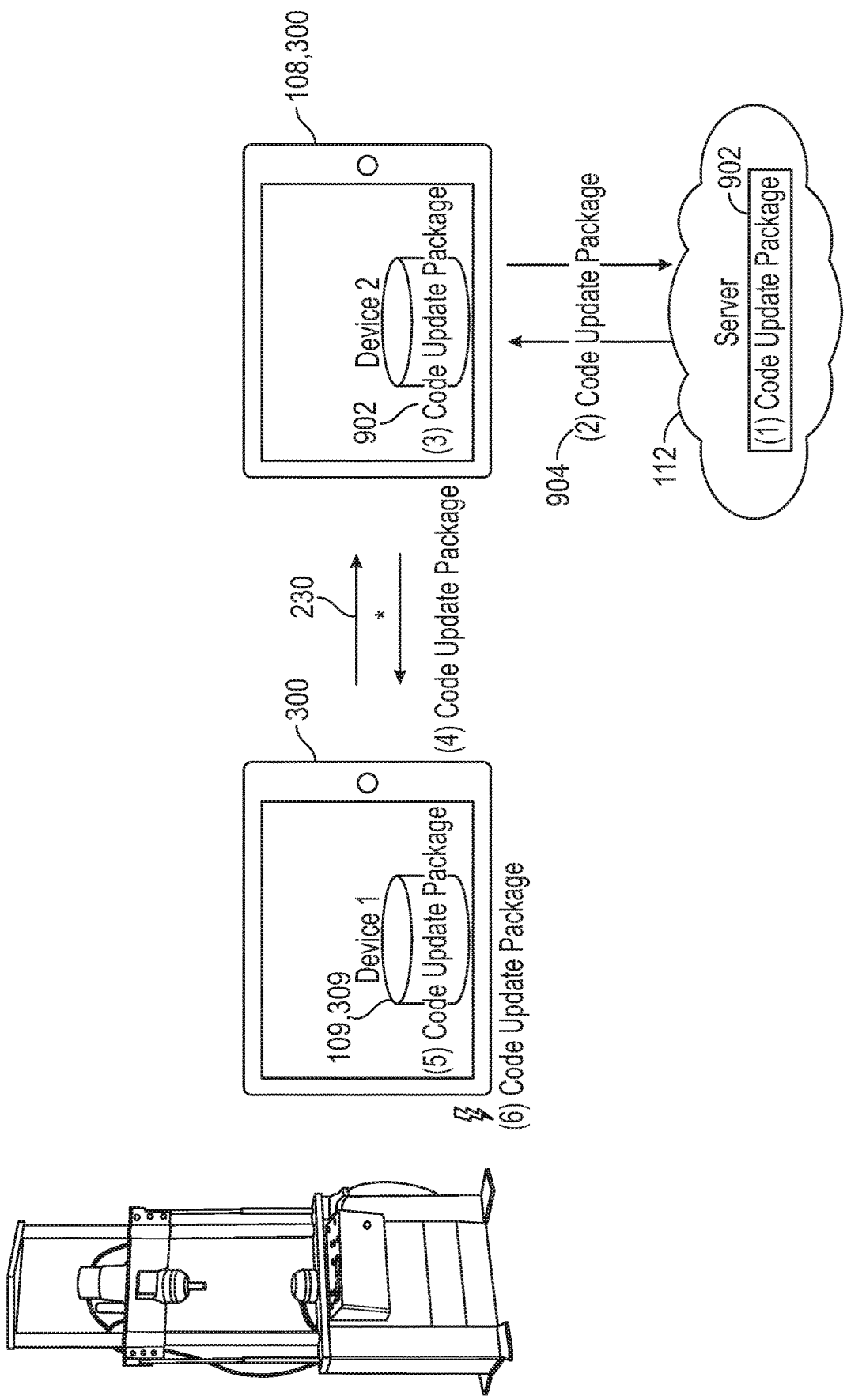
FIG. 9 illustrates a method embodiment for code updating in a system such as that shown in FIG. 1.

FIG. 9 illustrates a method for updating operating or application code for customer devices such as tablet 300. When a device such as tablet 108, 300 is online, device code updates may be pushed to the device from the remote storage 112. However, offline devices, or devices that are not internet connected, also may use updates. Like the provision of additional data 204 from a remote storage such as remote storage 112. Code package updates are passed in one embodiment from a connected/connectable device to an offline/non-connectable device in the same way. Each device that receives the update checks if it has installed it yet. If not, it installs the updates. Proper security checks are run prior to install, such as verifying the update signature, to ensure the update was published from the manufacturer and thus can be trusted.

As shown in FIG. 9, a code update package 902 is available at remote storage 112. Online device 108,300 is connected to the server at some point and downloads the code update as shown at arrow 904, saving the code update package 902 in its local storage (109, 309). Later, when device 108,300 is carried to an offline location and able to connect locally to offline device 300, the code update package 902 is delivered to offline device 300 via communication channel 230.

In one embodiment, an integrated routine maintenance tool is provided for FSE tablets 108. Certain tasks of maintenance are performed for every service visit. The integrated routine maintenance tool is visible only to FSE tablets 108, and allows a FSE to scan a tag, then initiate routine maintenance on that equipment. A special section walks the FSE through the appropriate tasks, customized to this particular system using past service history. The FSE uses the tool to record the condition of the equipment as found along with any improvements or changes made as part of the service. The FSE can record new issues found as health notifications. Default steps are defined with auxiliary data based on the model family of the system. The FSE can customize the steps based on unique needs of the particular system. These changes persist such that they are automatically used the next routine maintenance. The FSE can compare current state with past routine maintenance states. At the end, the routine maintenance data is stored as auxiliary data. Certain information is exposed to customers in the format of both static and dynamic routine maintenance report that is accessible when they scan the tag.

Figure 10:
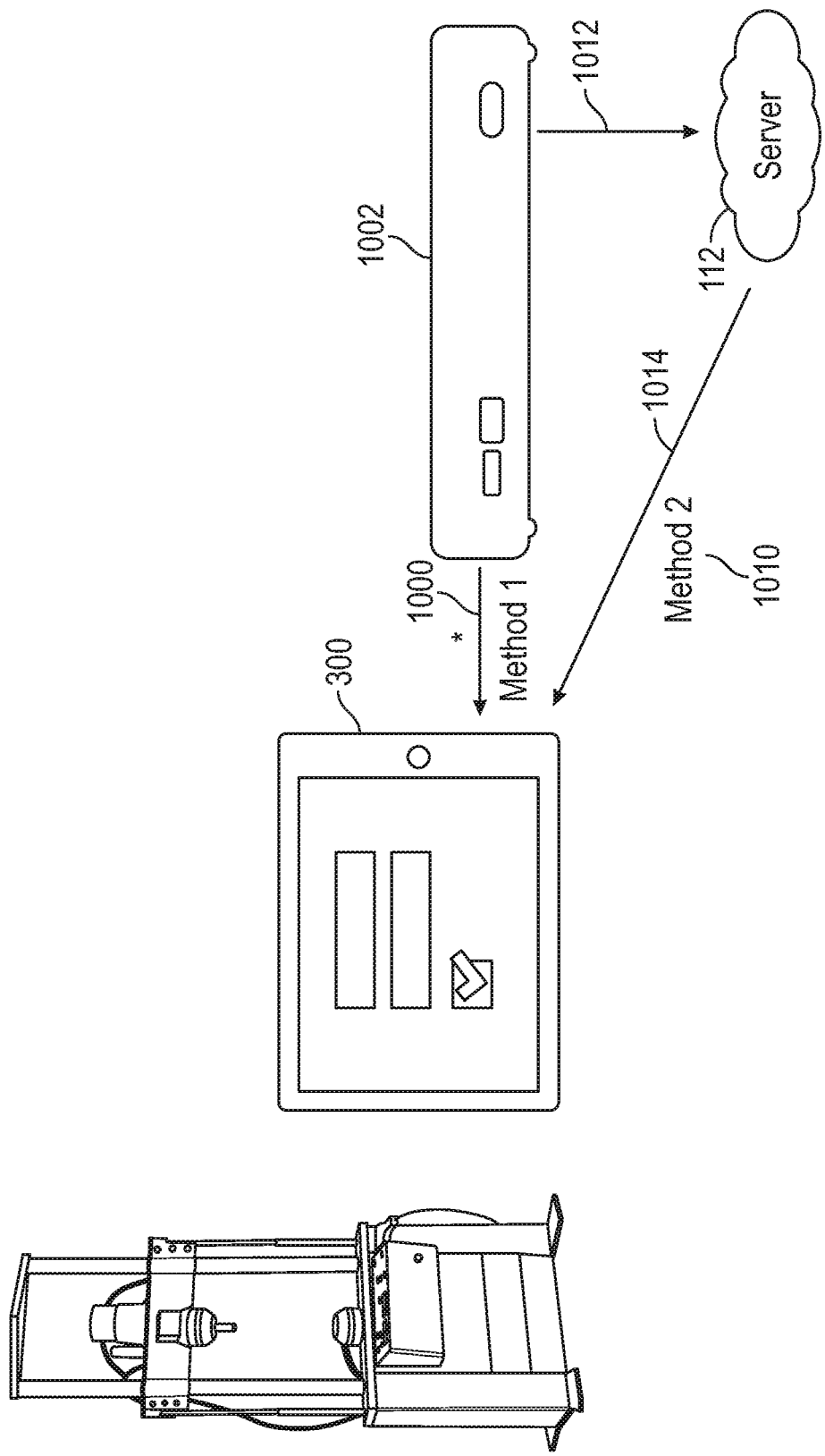
FIG. 10 illustrates method embodiments for automated health monitoring technology integration with embodiments of the present disclosure.

FIG. 10 illustrates an embodiment for automated health monitoring technology integration. In some situations, a customers will wish to see all of their health notifications in one screen. Some customers have automated technology looking for health issues on equipment every second. Two methods for automated health monitoring solutions are shown in FIG. 10, allowing health alerts from automated health equipment to be sent to a customer device 300 and be stored as auxiliary data or eventually written to the tag.

In first method 1000, health notifications or alerts, once detected on health monitoring hardware 1002, are sent to a local device 300 via a local connection protocol from the health monitoring hardware 1002. The device 300 stores this notification or alert with the appropriate equipment 104 auxiliary data 202 so the user can view it when scanning the service tag 102 for that equipment 104.

In second method 1010, health notifications or alerts, once detected on health monitoring hardware 1002, are sent to a remote server such as a server on remote storage 112, as shown at arrow 1012. The remote server 112 may send a notification to another server, or the same server may be used. The notification can be noted as auxiliary data on the server 112 and then synchronized down to the device 300 via any synchronization method such as those previously described, as shown at arrow 1014. In another embodiment, a device 300 may check the server specifically for any new notifications and then download these to process them and incorporate them into the equipment's history record.

Backloading Historic Data

In one embodiment, existing data records for a machine may be backloaded into the service tag 102, auxiliary data 202, or additional data 204 for integration with a newly added machine 104 or service tag 102. That is, the information available for a machine 104 on embodiments of the present disclosure is not fixed to only data generated once the system is deployed. There is strong value in inputting historic records into the system as well. For example, past maintenance records of the past five years or more may prove very useful for users. Existing data records may be updated to customer devices 300 and service tags 102 using one of the methods for communication as described herein, including direct connection, internet connection, and offline updating. Further, individual users can upload and attach these records, or automated scripts can upload hundreds of records automatically. In either case, the record is attached immediately to a specific tag 102 if possible and appropriately logged dependent on the type of record uploaded. If the record cannot automatically be tied to a specific tag 102, it remains in an orphaned state. A FSE or other user is prompted to attach orphaned records with a specific tag as sometimes a human is necessary to make the connection.

A server as described herein may be a computer program and/or hardware and/or firmware embodied on remote storage such as storage 112, or a stand-alone server connectable to remote/cloud storage 112 through known connection methods and apparatus. By way of example, the user interfaces described herein may be rendered on any suitable computing device such as mobile phones, tablet computing devices such as devices 108, 300, portable computing device such as laptops or the like (the aforementioned all being examples of "mobile" computing devices). It should be noted that although the user interfaces discussed herein are suitable for the architecture illustrated and described herein where the remote computing devices communicates with a remote test platform or cloud computing platform using any wired or wireless communication link, the user interfaces may be rendered on any of the afore-mentioned computing devices that are also in direct communication with the machines, such as a system controller or other computing device.

Figure 11:
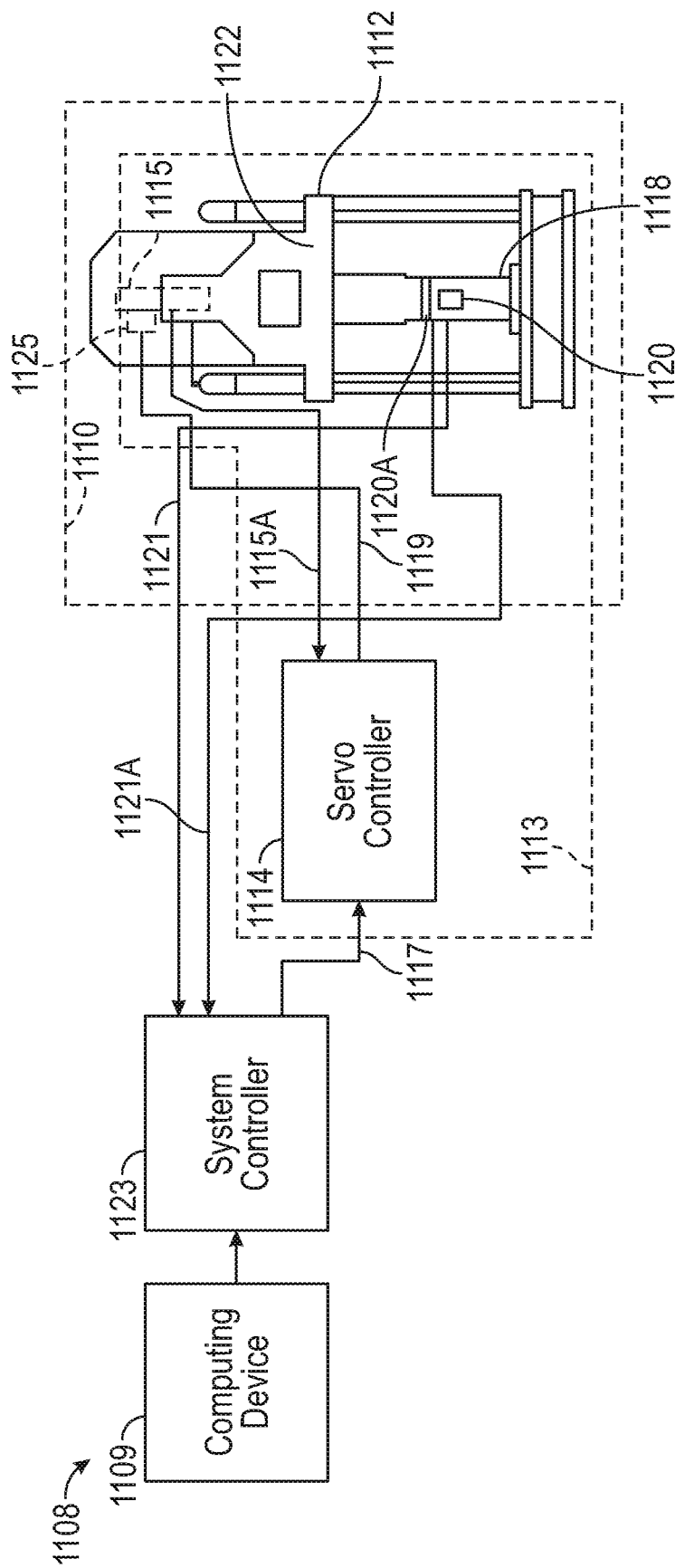
FIG. 11 illustrates an embodiment of computing platform on which embodiments of the present disclosure may be practiced.

FIG. 11 illustrates a testing machine system 1108 comprising a computing device 1109 for generating a GUI that more intuitively allows a user to interact and/or control a test machine 1112. Test machine 1112 includes a plant or physical system 1110. In the exemplary embodiment, the physical system 1110 generally includes a controllable element such as an actuator system, motor or the like. As illustrated in FIG. 11, the actuator system or assembly 1113 includes a controller 1114 and an actuator 1115 (hydraulic, pneumatic and/or electric) and mechanisms coupling actuators to any moveable member for imparting displacements or loads upon a test specimen 1118.

In the schematic illustration of FIG. 11, the actuator system 1113 is represented by actuator 1115 that in turn represents one or more actuators in any test machine 1112 that is coupled to the test specimen 1118 directly or indirectly. The controller 1114 provides an actuator command signal 1119 to a controlled device 1125 (e.g. servo valve, power controller) to operate the actuator 1115, which in turn, excites the test specimen 1118. It should be noted the controller 1114 is of a design suitable for controlling the type of actuator employed. Suitable feedback 1115A can be provided from the actuator 1115 to the controller 1114 or from other sensors. One or more remote transducers 1120 on the test specimen 1118 or physical system 1110, such as displacement sensors, strain gauges, accelerometers, load cells, thermometers or the like, provide a measured or actual response 1121. In the exemplary embodiment, a load cell 1120A also provides a response 1121A. A system controller 1123 receives actual response 1121 as feedback in a response to a drive 1117 as input to the servo controller 1114. In the illustration of FIG. 11, signal 1117 is a reference signal, signal 1119 is a manipulated variable (command to actuated device) and signal 1115A is a feedback variable. Although illustrated in FIG. 11 for the single channel case, multiple channel embodiments with signal 1115A comprising N feedback components and the signal 1119 comprising M manipulated variable components are typical and considered another embodiment of the present invention. The test specimen 1118 can take any number of forms such as but not limited to material samples, substructures or components. Typically, types of loads that can be applied or imparted to the test specimen 1118 include tension, compression and/or torsion in one or more degrees of freedom applied separately or at the same time. The test specimen 1118 can also or alternatively be subjected to controlled displacements in one or more degrees of freedom applied separately or at the same time.

Figure 12:
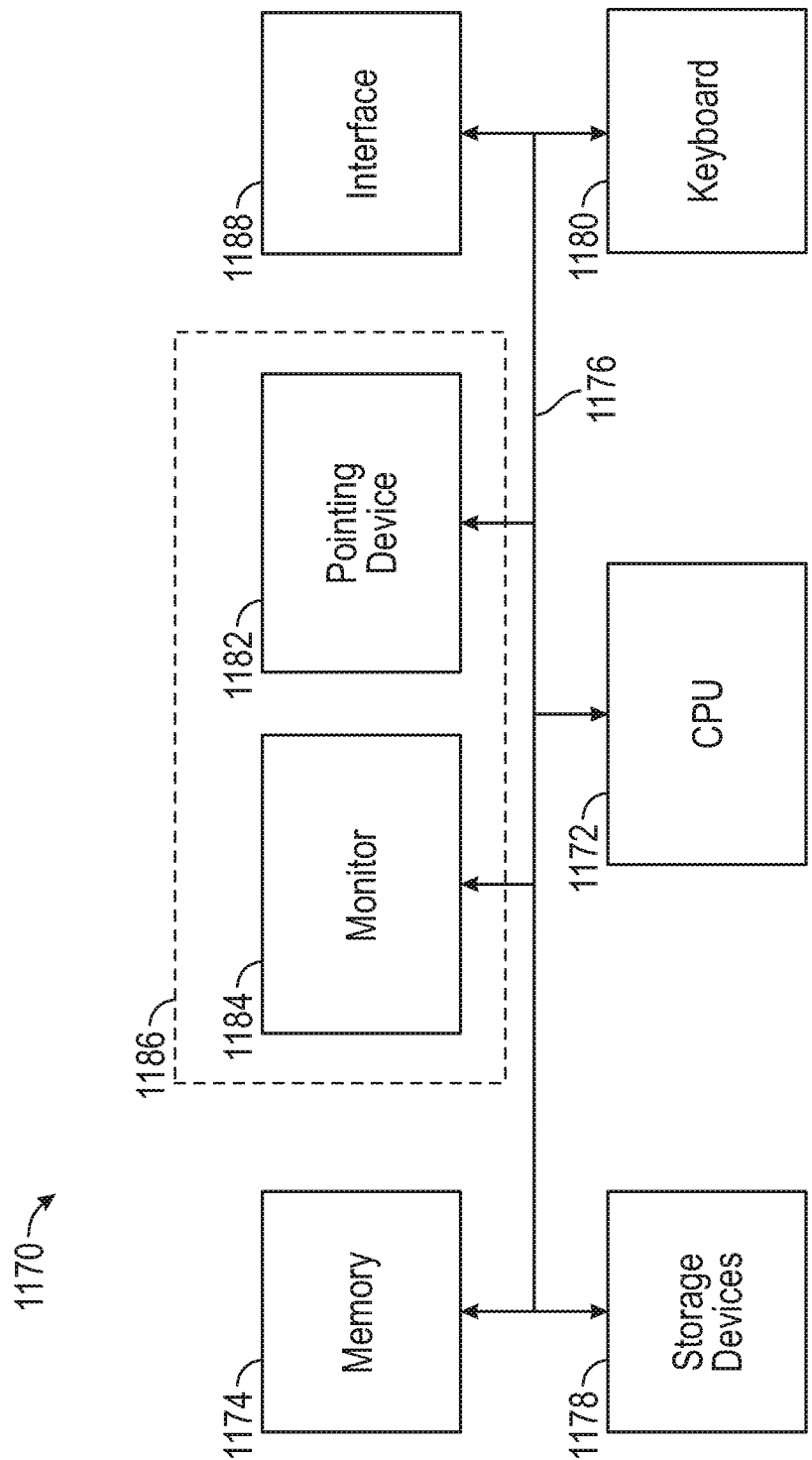
FIG. 12 schematically illustrates an exemplary embodiment of a computer.

The devices 108, 300 described herein may be implemented on a digital and/or analog computer, tablet, mobile device, or the like. FIG. 12 and the related discussion provide a brief, general description of a suitable computing environment in which embodiments of the present disclosure, including a server or servers, can be implemented. Although not required, components of the system can be implemented at least in part, in the general context of computer-executable instructions, such as program modules, being executed by devices 108, 300, or by a computer 1170 operating as a server, which may be connected in wired or wireless fashion to the devices 108, 300. Generally, program modules on the devices 108, 300, or on the server, or both, include routine programs, objects, components, data structures, etc., which perform particular tasks or implement particular abstract data types. Those skilled in the art can implement the description herein as computer-executable instructions storable on a computer readable medium. Moreover, those skilled in the art will appreciate that the embodiments of the disclosure may be practiced with other computer system configurations, including multi-processor systems, networked personal computers, mini computers, main frame computers, mobile devices, and the like. Aspects of the disclosure may also be practiced in distributed computing environments where tasks are performed by remote processing devices that are linked through a communications network. In a distributed computer environment, program modules may be located in both local and remote memory storage devices.

The computer 1170 comprises in one embodiment a conventional computer having a central processing unit (CPU) 1172, memory 1174 and a system bus 1176, which couples various system components, including memory 1174 to the CPU 1172. The system bus 1176 may be any of several types of bus structures including a memory bus or a memory controller, a peripheral bus, and a local bus using any of a variety of bus architectures. The memory 1174 includes read only memory (ROM) and random access memory (RAM). A basic input/output (BIOS) containing the basic routine that helps to transfer information between elements within the computer 1170, such as during start-up, is stored in ROM. Storage devices 1178, such as a hard disk, a floppy disk drive, an optical disk drive, etc., are coupled to the system bus 1176 and are used for storage of programs and data. It should be appreciated by those skilled in the art that other types of computer readable media that are accessible by a computer, such as magnetic cassettes, flash memory cards, digital video disks, random access memories, read only memories, and the like, may also be used as storage devices. Commonly, programs are loaded into memory 1174 from at least one of the storage devices 1178 with or without accompanying data.

Input devices such as a keyboard 1180 and/or pointing device (e.g. mouse, joystick(s)) 1182, or the like, allow the user to provide commands to the computer 1170. A monitor 1184 or other type of output device can be further connected to the system bus 1176 via a suitable interface and can provide feedback to the user. If the monitor 1184 is a touch screen, the pointing device 1182 can be incorporated therewith. The monitor 1184 and input pointing device 382 such as mouse together with corresponding software drivers can form a graphical user interface (GUI) 1186 for computer 1170. Interfaces 1188 on the computer 1170 allow communication to other computer systems if necessary. Interfaces 1188 also represent circuitry used to send signals to or receive signals from the actuators and/or sensing devices mentioned above. Commonly, such circuitry comprises digital-to-analog (D/A) and analog-to-digital (A/D) converters as is well known in the art.

Although the subject matter has been described in language specific to structural features and/or methodological acts, it is to be understood that the subject matter defined in the appended claims is not necessarily limited to the specific features or acts described above as has been held by the courts. Rather, the specific features and acts described above are disclosed as example forms of implementing the claims.

What is claimed is:

1. A computer implemented method of lab management, comprising:
    providing machine information on a service tag for a machine, the machine information suitable for uniquely identifying the machine;
    storing auxiliary information about the machine on at least one of one or more remote devices, the at least one of the one or more remote devices configured to scan the service tag to retrieve machine information therefrom, and to integrate the auxiliary information with the machine information on the service tag; and
    updating a knowledge base for the machine having the service tag containing machine specific information, wherein updating comprises:
        reading the machine specific information from the service tag with a computing device;
        accessing auxiliary information on the machine from storage of the computing device;
        accessing additional information on the machine from storage of a remote server;
        combining the machine specific information, the auxiliary information, and the additional information into a new set of machine information; and
        updating at least the auxiliary information on the computing device with the new set of machine information.

2. The computer implemented method of claim 1, and further comprising storing additional information about the machine at a remote server accessible by the at least one of the one or more remote devices.

3. The computer implemented method of claim 1, wherein the one or more remote devices includes at least a field service engineer device and a customer device.

4. The computer implemented method of claim 1, and further comprising:
    creating a new set of machine information comprising auxiliary and additional information; and
    synchronizing the new set of machine information to each of the one or more remote devices.

5. The computer implemented method of claim 1, and further comprising synchronizing machine information to a remote server accessible by at least one of the one or more remote devices.

6. The computer implemented method of claim 1, wherein machine information includes information relating to at least one of service, calibration, health status, and maintenance status of the machine.

7. The computer implemented method of claim 1, wherein providing machine information on the service tag comprises providing information on one of a near field communication chip, a QR code, a barcode, a Bluetooth device, or a radio frequency identification tag.

8. The computer implemented method of claim 1, wherein providing machine information comprises providing one or more of model number #, serial # number, date of manufacture, product label information, and customer machine identifier.

9. The computer implemented method of claim 1, and further comprising:

servicing the machine having the service tag containing identifying information about the machine, wherein servicing comprises:
   reading data from the service tag using a mobile computing device;
   using the service tag data transferred from or read from the service tag to look up any auxiliary data on the machine that is stored in the mobile computing device; or
   using the service tag data transferred from or read from the service tag to look up any additional data on the machine that is stored remotely to the mobile computing device; or
   using the service tag data transferred from or read from the service tag for communicating maintenance current state, actions done, and future actions required on the machine; and
   using combined information comprising at least one of service tag data, auxiliary data, and additional data to identify potential service issues for the machine.

10. The computer implemented method of claim 1, and further comprising synchronizing the new set of machine information to the storage of the remote server.

11. The computer implemented method of claim 1, and further comprising updating any additional remote devices that access the machine via the service tag with the new set of machine information.

12. The computer implemented method of claim 1, and further comprising updating any additional remote computing devices that access the computing device with the new set of machine information.

13. The computer implemented method of claim 1, and further comprising:
   automatic health monitoring of the machine having the service tag containing machine specific information, wherein automatic health monitoring comprises:
      accessing an automated health alert generated for or by a machine from its service tag;
      scanning the service tag with a mobile computing device; and
      receiving at the mobile computing device the automated health alert.

14. The computer implemented method of claim 1, and further comprising
   obtaining service on the machine having the service tag with machine specific information, comprising:
      scanning the service tag to obtain the machine specific information with a mobile computing device;
      selecting an icon in a graphical user interface for the machine on the mobile computing device for help and support; and
      connecting a user to machine specific support using the machine specific information.

15. The method of claim 14, wherein connecting the user to machine specific support is accomplished without entering of information by the user.

16. The method of claim 14, wherein connecting the user to machine specific support includes providing information regarding machine history, maintenance, service, health status to a customer service support representative without entering of information by the user.

17. A computer implemented method of lab management, comprising:
   providing machine information on a service tag for a machine, the machine information suitable for uniquely identifying the machine;
   storing auxiliary information about the machine on at least one of one or more remote devices, the at least one of the one or more remote devices configured to scan the service tag to retrieve machine information therefrom, and to integrate the auxiliary information with the machine information on the service tag; and
   health tracking of the machine, wherein health tracking comprises:
      synchronizing machine data across a network of connected devices including at least a service tag on the machine, a remote computing device, and a remote server, wherein synchronizing comprises:
         combining machine information from the service tag, the remote computing device, and the remote server;
         updating the machine information across the remote computing device and the remote server; and
         updating the machine information to a latest iteration for any remote computing device accessing the machine via the service tag.

18. A computer implemented method of lab management, comprising:
   providing machine information on a service tag for a machine, the machine information suitable for uniquely identifying the machine;
   storing auxiliary information about the machine on at least one of one or more remote devices, the at least one of the one or more remote devices configured to scan the service tag to retrieve machine information therefrom, and to integrate the auxiliary information with the machine information on the service tag; and
   updating program code in at least one of the one or more remote devices, wherein the one or more remote devices comprise one or more mobile computing devices, comprising:
      providing a program code update for the plurality of mobile computing devices at a remote server;
      updating program code for any of the plurality of mobile computing devices that connect to the remote server;
      storing the program code update on updated mobile computing devices; and
      updating program code for a non-updated mobile computing device of the plurality of mobile computing devices when the non-updated mobile computing device connects to an updated mobile computing device.

19. A computer implemented method of lab management, comprising:
   providing machine information on a service tag for a machine, the machine information suitable for uniquely identifying the machine;
   storing auxiliary information about the machine on at least one of one or more remote devices, the at least one of the one or more remote devices configured to scan the service tag to retrieve machine information therefrom, and to integrate the auxiliary information with the machine information on the service tag;
   obtaining service on the machine having the service tag with machine specific information, comprising:
      selecting an icon in a graphical user interface on a mobile computing device for indicating that support is desired for an unspecified machine;
      after selecting, scanning the service tag of a specific machine to obtain machine specific information for the specific machine with the mobile computing device; and connecting a user to machine specific support for the specific machine using the machine information.

* * * * *